United States Patent
Tarui et al.

(12) 
(10) Patent No.: US 6,510,496 B1
(45) Date of Patent: Jan. 21, 2003

(54) SHARED MEMORY MULTIPROCESSOR SYSTEM AND METHOD WITH ADDRESS TRANSLATION BETWEEN PARTITIONS AND RESETTING OF NODES INCLUDED IN OTHER PARTITIONS

(75) Inventors: Toshiaki Tarui, Sagamihara (JP); Toshio Okochi, Cambridge (GB); Shinichi Kawamoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/501,978

(22) Filed: Feb. 11, 2000

(30) Foreign Application Priority Data

Feb. 16, 1999 (JP) .......................................... 11-036811

(51) Int. Cl.[7] ........................ G06F 12/10; G06F 13/00
(52) U.S. Cl. ........................ 711/147; 711/153; 711/202; 711/173; 711/146; 711/209; 709/215
(58) Field of Search ................................ 711/147, 153, 711/202, 173, 141, 170, 206, 146, 209; 709/213, 215

(56) References Cited

U.S. PATENT DOCUMENTS

| | | | | |
|---|---|---|---|---|
| 4,843,541 A | * | 6/1989 | Bean et al. ..................... 710/36 |
| 5,862,357 A | * | 1/1999 | Hagersten et al. ........... 710/305 |
| 5,898,883 A | * | 4/1999 | Fujii et al. ..................... 712/28 |
| 5,923,847 A | * | 7/1999 | Hagersten et al. .......... 709/215 |
| 5,940,870 A | * | 8/1999 | Chi et al. .................... 711/206 |
| 6,088,770 A | * | 7/2000 | Tarui et al. .................. 711/148 |
| 6,295,584 B1 | * | 9/2001 | DeSota et al. .............. 711/147 |
| 6,334,177 B1 | * | 12/2001 | Baumgartner et al. ........ 712/13 |

FOREIGN PATENT DOCUMENTS

JP 10-240707 * 9/1998

OTHER PUBLICATIONS

"Hive: Fault Containment for Shared Memory Multiprocessors," 15th ACM Symposium on Operating Systems Principles, Dec. 3–6, 1995, Copper Mountain Resort, Colorado, pp. 12–25.*

"Gigaplane–XB: Extending the Ultra Enterprise Family," HOT Interconnects V, Aug. 1997, pp. 97–112.*

* cited by examiner

Primary Examiner—Glenn Gossage
(74) Attorney, Agent, or Firm—Antonelli, Terry, Stout & Kraus, LLP

(57) ABSTRACT

A symmetric multiprocessor (SMP) of hierarchical connection realizing an inter-partition shared memory has at the gateway of an inter-node connection switch from each node, a translator for translating an address of an access command for an area shared between partitions, between a real address used in a partition and a shared area address used in common between partitions. Thereby, the address of a local area of each partition is freely set, and cache coherent control of a shared area is conducted at high speed by using a snoop command of the hierarchical connection SMP. Fault containment between partitions is realized by checking conformity between the address of the access command issued from another partition and the shared area configuration. Nodes included in other partitions may be reset from each partition. In addition, the configuration information of the shared area between partitions may be dynamically modified.

17 Claims, 16 Drawing Sheets

FIG. 4

| # | SITUATION | ADDRESS IN INTERNAL BUS | ADDRESS IN THE SWITCH | TRANSLATION METHOD FROM/INTO ADDRESS IN THE SWITCH | DESTINATION OF SNOOP COMMAND | ERROR DETECTION |
|---|---|---|---|---|---|---|
| 1 | NOT SHARED | ADDRESS IN MAIN MEMORY OF PARTITION | ADDRESS IN PARTITION | NO TRANSLATION | NODES IN OWN PARTITION | ACCESS SOURCE IS IN OTHER PARTITION |
| 2 | SHARED — HOME NODE BELONGS TO OWN PARTITION (EXPORTING SIDE) | ADDRESS IN MAIN MEMORY OF PARTITION | ADDRESS IN SHARED MEMORY SPACE | OPEN AN AREA WHICH IS A SHARED IN MAIN MEMORY OF OWN PARTITION, ON SHARED MEMORY SPACE | ALL NODES | ACCESS SOURCE IS NOT AUTHORIZED TO SHARE |
| 3 | SHARED — HOME NODE DOES NOT BELONG TO OWN PARTITION (IMPORTING SIDE) | ADDRESS OF ACCESS WINDOW FOR ACCESSING MAIN MEMORY OF PARTITIONS | ADDRESS IN SHARED MEMORY SPACE | MAP AN AREA ON SHARED MEMORY SPACE, THE AREA HAVING BEEN OPENED AS #2, TO AN AREA FOR WHICH MAIN MEMORY OF OWN PARTITION IS NOT SUPPLIED | ALL NODES | ACCESS SOURCE IS NOT AUTHORIZED TO SHARE |

FIG. 7

PARTITION CONFIGURATION

| | NODE 0 | NODE 1 | NODE 2 | ... | NODE 7 | LOCAL PARTITION FLAG |
|---|---|---|---|---|---|---|
| PARTITION 0 | 1 | 1 | 1 | 1 0 0 0 | 0 | 1 |
| PARTITION 1 | 0 | 0 | 0 | 0 1 1 0 | 0 | 0 |
| PARTITION 2 | 0 | 0 | 0 | 0 0 0 1 | 1 | 0 |
| PARTITION 3 | 0 | 0 | 0 | 0 0 0 0 | 0 | 0 |
| ... | | | | | | |
| PARTITION 7 | 0 | 0 | 0 | 0 0 0 0 | 0 | 0 |

MAIN MEMORY CONFIGURATION INFORMATION PARTITION

| | ADDRESS RANGE EACH NODE TAKES CHARGE OF | | VALID BIT |
|---|---|---|---|
| NODE 0 | START ADDRESS | END ADDRESS | 1 |
| NODE 1 | START ADDRESS | END ADDRESS | 1 |
| ... | | | |
| NODE 3 | START ADDRESS | END ADDRESS | 1 |
| NODE 4 | START ADDRESS | END ADDRESS | 0 |
| ... | | | |
| NODE 7 | START ADDRESS | END ADDRESS | 0 |

166  167  168

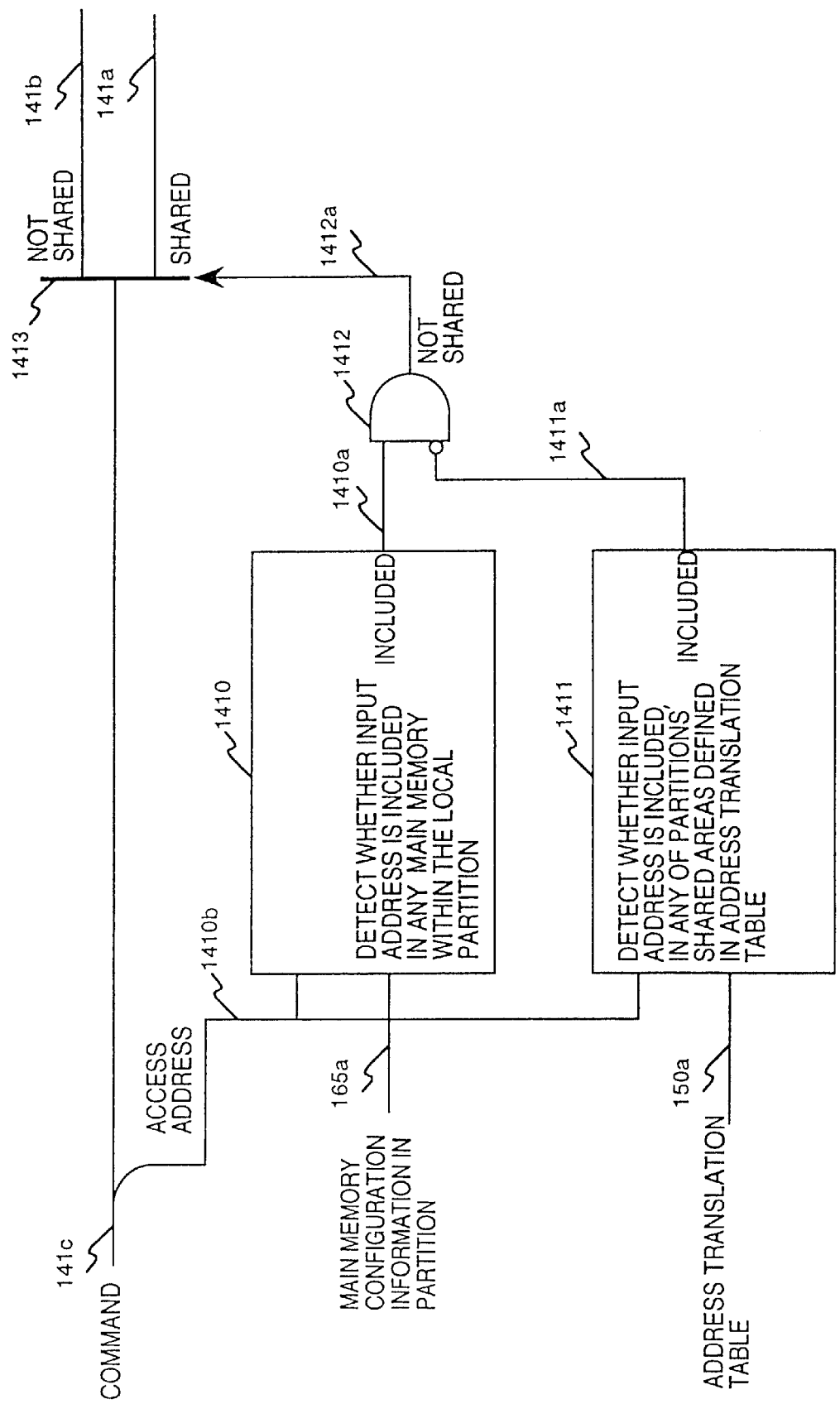

FIG. 10

| # | SITUATION | COMMAND ON NOT-SHARED ADDRESS (INPUT FROM 141b) | COMMAND ON SHARED ADDRESS (INPUT FROM 144b) |
|---|---|---|---|
| 1 | SNOOP COMMAND (F,FI,I) — REQUEST | MULTICAST IN PARTITION GLOBAL BIT = 0 | BROADCAST IN ALL NODES GLOBAL BIT = 1 |
| 2 | MAIN MEMORY ACCESS (WB,UR,UW) — REQUEST | SEND TO HOME NODE IN LOCAL PARTITION, INDICATED IN PARTITION CONFIGURATION INFORMATION GLOBAL BIT = 0 | SEND TO HOME NODE, INDICATED IN ADDRESS TRANSLATION TABLE GLOBAL BIT = 1 |
| 3 | ACKNOWLEDGE (D,DM,ND,DND) | RETURN TO REQUESTING NODE GLOBAL BIT = 0 | RETURN TO REQUESTING NODE GLOBAL BIT = 1 |

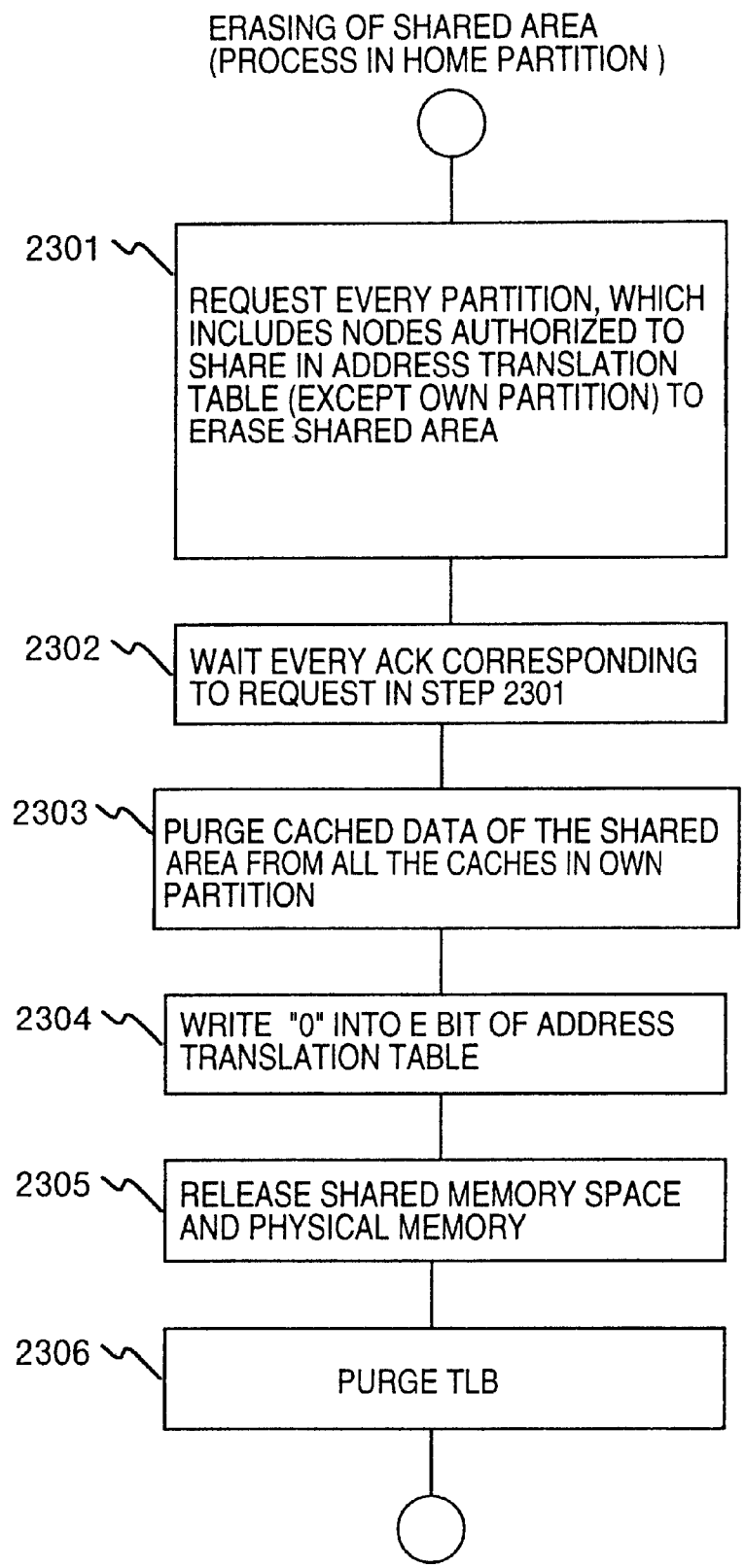

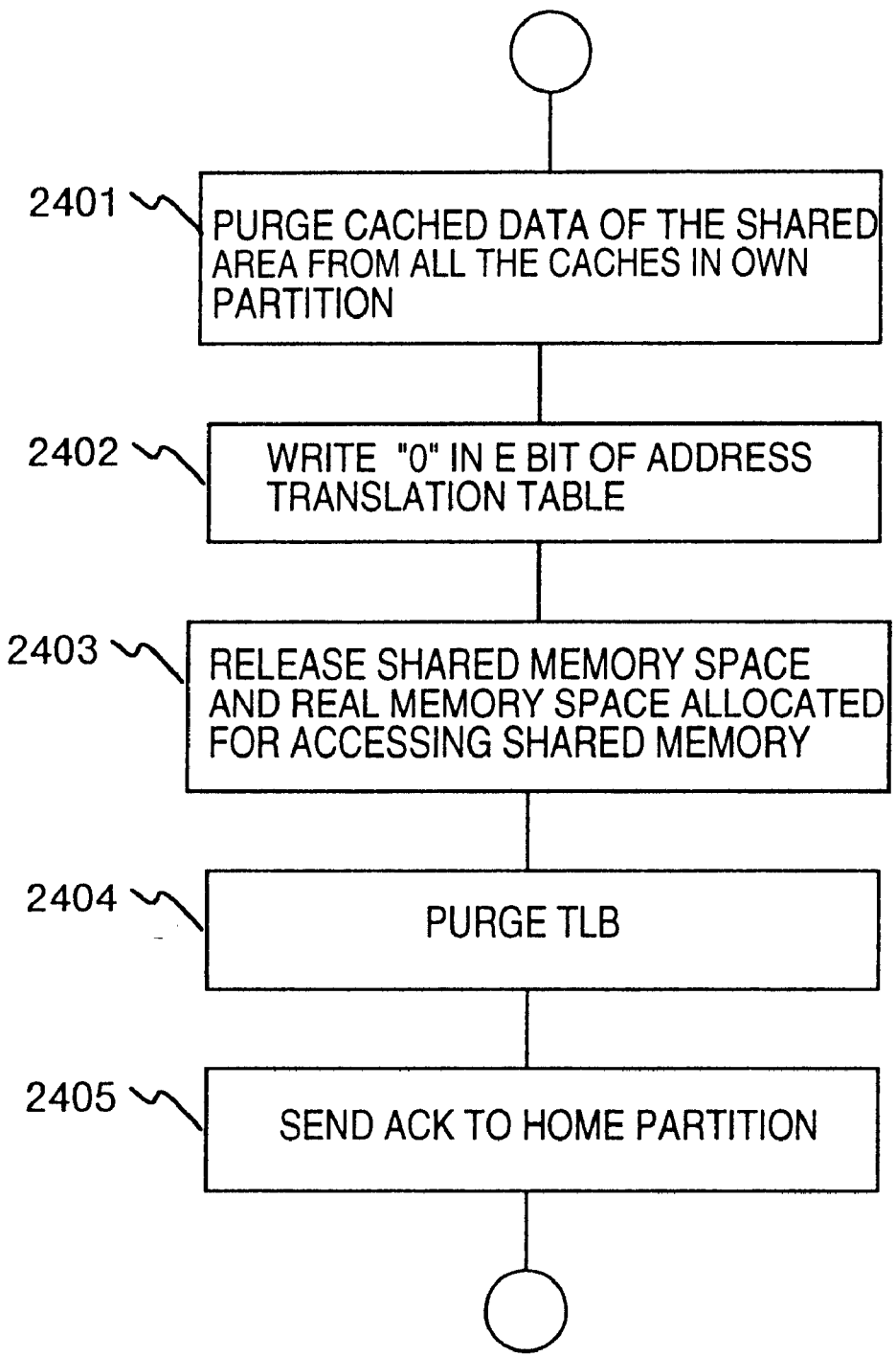

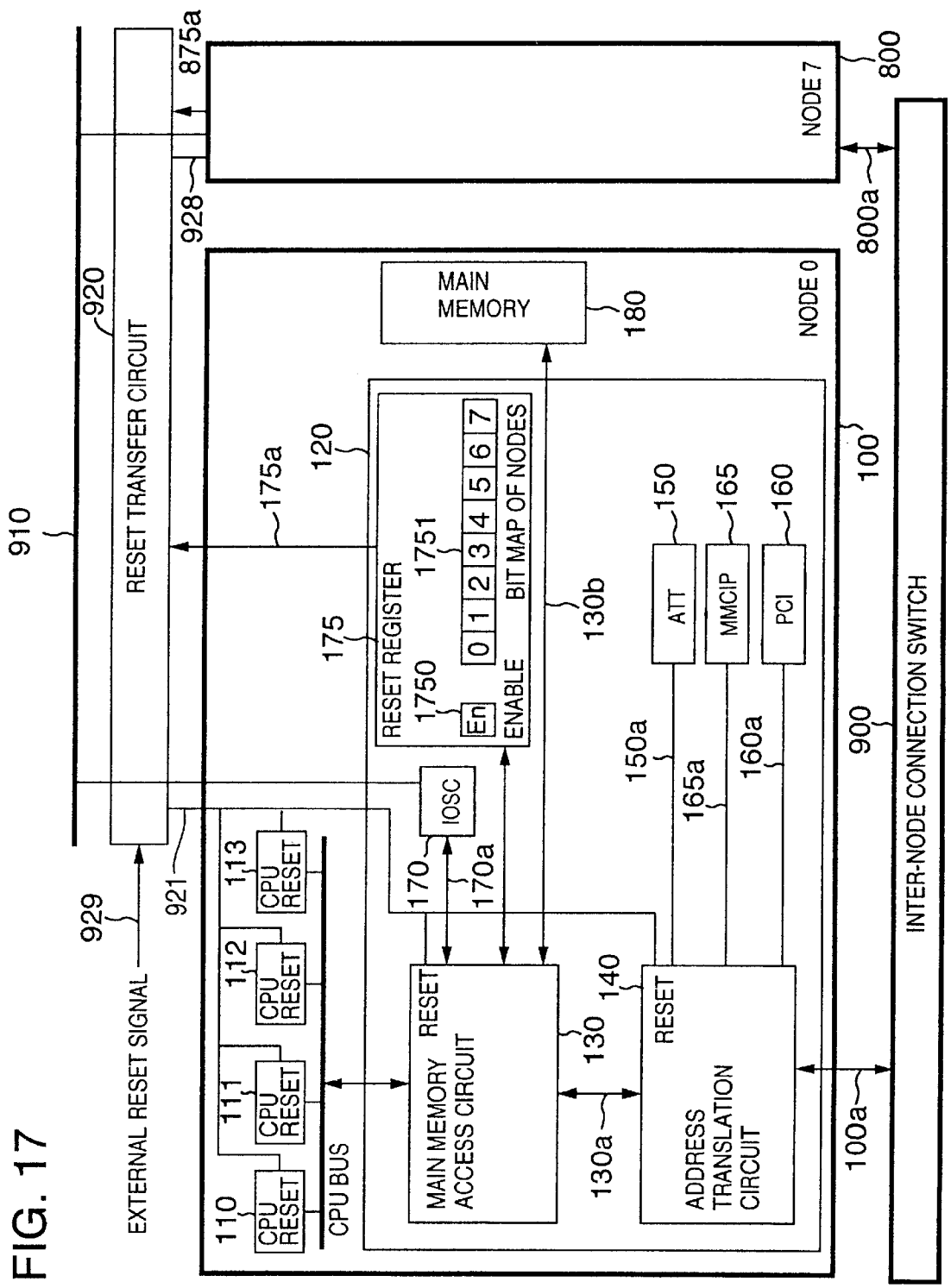

SHARED MEMORY MULTIPROCESSOR SYSTEM AND METHOD WITH ADDRESS TRANSLATION BETWEEN PARTITIONS AND RESETTING OF NODES INCLUDED IN OTHER PARTITIONS

CROSS-REFERENCE TO RELATED APPLICATION

The present application relates to subject matter described in application Ser. No. 09/030,957 filed Feb. 26, 1998 entitled "Shared Memory Multiprocessor", now U.S. Pat. No. 6,088,770, the disclosure of which is hereby incorporated by reference.

BACKGROUND OF THE INVENTION

The present invention relates to a shared memory parallel processor system used in information processing apparatuses, especially used in personal computers (PCs), work stations (WSs), and server machines. In particular, the present invention relates to a control scheme of a shared memory between partitions.

In recent years, use of the architecture of the shared memory multiprocessor as a host module of the parallel processors has spread. In this architecture, such a configuration where several tens to several hundreds processors share a main memory is needed in some cases in order to improve the performance. As the configuration method of the shared memory multiprocessor, bus connection symmetrical multiprocessors (SMPs) used in personal computers are typical. Since the bus throughput forms a bottleneck in the bus connection SMPs, however, the number of processors which can be connected is limited to approximately four. Thus the bus connection SMP is not suitable for such a scheme as to connect a large number of processors.

In order to solve the above described problem, there has been proposed a method of connection bus connecting SMPs hierarchically by using a crossbar switch or the like. A typical example of the hierarchical SMP is found in "Gigaplane—XB: Extending the Ultra Enterprise Family", HOT Interconnects V, pp. 97 to 112, August 1997. The crossbar switch or the like between nodes logically functions as a bus. Coherence of a CPU cache between nodes of the bus connection SMP having processors and main memories can be managed at high speed by using a bus snoop protocol.

As one of problems of the large scale shared memory multiprocessor as described above, there is reliability. In conventional shared memory multiprocessors, the whole system has one Operation System (OS). Since all processors of the system can be managed by one OS, this scheme has an advantage that flexible system operation (such as load distribution) can be conducted. However, this scheme has a drawback that the system reliability falls in the case where a large number of processors are connected in a shared memory multiprocessor configuration. In a server of a cluster configuration in which a plurality of processors are connected by a network, respective nodes have different OSs. Even if a fatal error such as a bug or the like of an OS or the like occurs, only the corresponding node suffers from a system down state. On the other hand, if a certain processor is brought into a down state by a system bug or the like in the case where the whole system is controlled by one OS in a shared memory multiprocessor, the OS is brought into a down state and consequently all processors are affected.

In order to solve this problem, there has been proposed such a scheme that the inside of a shared memory multiprocessor is divided into a plurality of partitions and a plurality of OSs are run independently. Each partition has an independent main memory. A processor of a certain partition basically accesses only the main memory of its own partition. As a result, it becomes possible to realize the fault containment between partitions and improve the system performance.

Furthermore, also for improving the operation performance and reducing the management cost using server consolidation, it is desired to integrate works which have been conducted by a plurality of servers into one highly multiplexed server. The above described partition technique is indispensable.

In the case where a shared memory multiprocessor is divided into partitions, how communication is conducted between partitions poses a problem. A scheme in which communication between partitions is conducted by making efficient use of a shared memory mechanism provided in a system before partitioning is at advantage in performance. Therefore, realization of a shared memory between partitions becomes necessary.

A partition technique of making a plurality of OSs run in one system has been used heretofore in mainframes, and it has been disclosed in U.S. Pat. No. 4,843,541. In this scheme, it is possible to make a plurality of guest OSs operate under the management of a host OS which manages the whole system. Respective guest OSs are independent systems having different address spaces. Access to a main memory in each partition is conducted according to the following procedure.

(1) A virtual address of a guest is translated to a real address.
(2) The above described guest real address is translated to a main memory address in the host.
(3) The main memory is accessed by using the main memory address in the host derived in (2).

The above described address translation of the two stages must be conducted between a CPU and the main memory.

In the partitions of the main frame, it is made possible for respective guest partitions to have different address spaces and the fault containment is realized by conducting the above described address translation of the two stages. By overlapping addresses of guests in the address translation of (3), the shared memory can be realized.

In realizing a partition mechanism and an inter-partition shared memory of a hierarchical bus connection SMP by using the above described conventional techniques, there are problems described hereafter.

The conventional inter-partition shared memory mechanism is premised on a concentrated main memory architecture having an address translation mechanism of two stages between each CPU and the main memory. Therefore, the conventional inter-partition shared memory mechanism is largely different in architecture from the hierarchical bus connection SMP. Accordingly, the conventional technique cannot be applied to the hierarchical bus connection SMP as it is. In particular, respective CPUS use standard components. As a result, the address translation of the two stages used in the conventional technique cannot be conducted in the CPU, and relocation of the address of each partition (guest) cannot be conducted.

Furthermore, in the hierarchical SMP, the CPU cache coherence is kept at a high speed by using the bus snoop protocol. Therefore, the inter-partition shared memory mechanism needs to be capable of supporting the bus snoop protocol.

SUMMARY OF THE INVENTION

Therefore, an object of the present invention is to realize a partition mechanism and an inter-partition shared memory mechanism suitable for the architecture of the hierarchical SMP.

In addition, a future parallel system must support a general purpose OS. Accordingly, the partition system needs to have a general purpose architecture which does not depend on a specific OS. It is necessary to make it possible for each partition to have a free address space. In addition, it is necessary to realize dynamic generation and erasing of a partition in order to deal with a large number of applications and improve the reliability of the system by using dynamic reconfiguration of partitions.

Another object of the present invention is to flexibly manage the configuration of the inter-partition shared memory.

In addition, the partition system needs to realize high reliability at a low cost. Thus it is indispensable for partitions to back up each other. Therefore, a third object of the present invention is to facilitate recovery from an error from another partition in the case where the OS of a certain partition suffers from system down.

In order to achieve the above described first and second objects, such a hierarchical SMP that nodes each having CPUs coupled by a bus and a main memory are connected by a switch and cache coherence control is conducted through the switch, at the gateway of the switch from each node when the inside of the system is divided into partitions in each of which a different OS operates, with means for mutually translating an address of an access command for an area shared between partitions, between a real address used in a partition and an address used in common between partitions. As a result, the address of a local area of each partition is freely set. In addition, cache coherence control of the shared area can be conducted at high speed by using a snoop command of the hierarchical SMP.

Furthermore, in another preferred aspect of the present invention, conformity between the address of the access command issued from another partition and the configuration of the shared area is checked at the gateway of each node. As a result, fault containment can be realized between partitions.

Furthermore, in another preferred aspect of the present invention, there is provided apparatus for the system software to dynamically modify the configuration information of the shared area between partitions. As a result, flexible management of the shared area becomes possible.

In addition, in order to achieve the above described third object, each partition is provided with a function of resetting CPUs of other partitions. In the case where a certain partition suffers from system down, it is possible to reset and re-initialize the partitions which have suffered from system down.

BRIEF DESCRIPTION OF THE DRAWINGS

FIG. 4 shows a summary table of relations between access addresses and operations of address translation circuits of respective nodes;

FIG. 7 shows the configuration of partition configuration information of respective nodes;

FIG. 8 shows the configuration of main memory configuration information in partition of respective nodes;

FIG. 9 shows a detailed diagram of a shared area detect circuit of each node;

FIG 10 shows a table describing relations between access commands and a destination indicate and global bit addition circuit of respective nodes;

FIG. 15 shows a flow diagram showing a process conducted on a home partition side when a shared area is erased in a multiprocessor system of the present invention;

FIG. 16 shows a flow diagram showing a process conducted on a side of a partition which imports the shared area when a shared area is erased in a multiprocessor system of the present invention; and FIG. 17 shows the details of a reset circuit in a multiprocessor system of the present invention.

DESCRIPTION OF THE EMBODIMENTS

Figure 1:
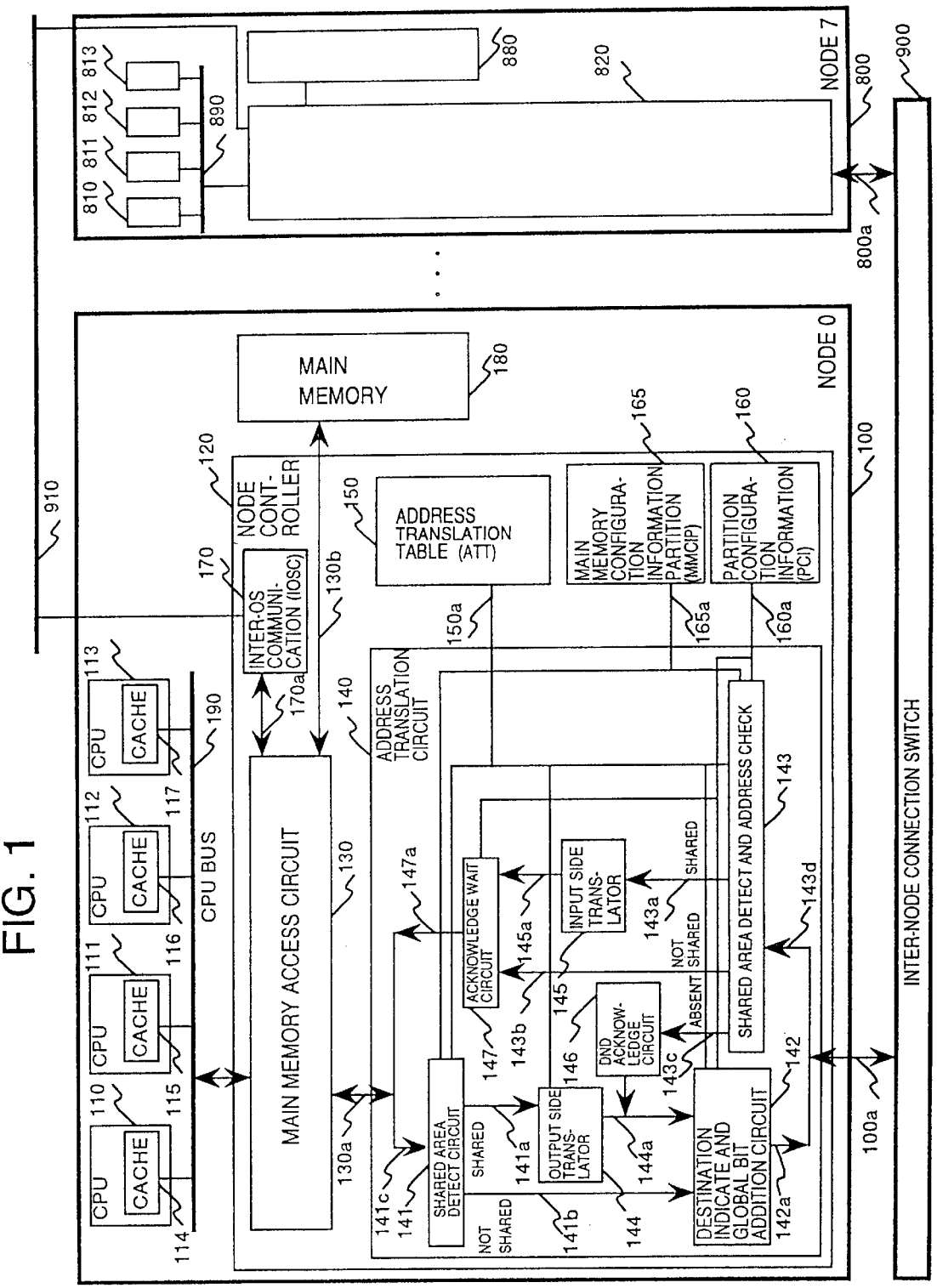
FIG. 1 shows a shared memory multiprocessor having a partition mechanism according to the present invention.

FIG. 1 is a block diagram of a shared memory multiprocessor according to the present invention. The present system is an 8-node system. A plurality of nodes 100 to 800 (which are sometimes referred to as nodes 0 to 7) are connected by a bus or internode connection switch 900. Six nodes other than the nodes 100 and 800 are omitted in FIG. 1 in order to avoid the complexity. However, every node has the same structure. By taking the node 0 as a representative example, the structure will be described. The node has a main memory 180 and four processors, i.e., Central Processor Units (CPUs) 110, 111, 112 and 113. These CPUs are coupled to a node controller 120 via a CPU bus 190. The node controller 120 includes a main memory access circuit 130, an address translation circuit 140, partition configuration information 160, and main memory configuration information partition 165. The main memory 180 forms a part of a main memory common to this system, and holds a part of a program executed by each node and data. This system is the so-called parallel processor system of distributed shared memory type.

The cache coherence between CPUs in the node is managed by a bus snoop protocol. As the bus snoop technique, a known technique is employed. In FIG. 1, the CPUS in the node are connected by the bus. As for the hardware, however, a coupling scheme other than the bus, such as one-to-one coupling or coupling using a switch, may also be used. As for these connection methods in the nodes, various known techniques can be applied.

The cache coherence between the CPUs of the nodes is also managed by using the bus snoop protocol. The internode connection switch 900 logically functions in the same way as the bus.

The address translation circuit 140 is hardware for translation between an address in the node (an address used by the CPUs 110 to 113, the CPU bus 190, and the main memory 180) and an address used by the inter-node connection switch 900 (an address outside the node).

Within the address translation circuit 140, the side for outputting a command from the inside of the node includes a shared area detect circuit 141 for determining whether the accessed area is a shared area, an output side translator 144 for translating the address of the shared area, and a destination indicate and global bit addition circuit 142 for sending out a command to proper destination. The side for inputting a command from the outside of the node includes a shared area detect and address check circuit 143 for determining whether a command from another node is a command directed to a shared area and checking the address, an input side translator 145 for translating the address of a shared area, a DND acknowledge circuit 146 for issuing an acknowledge in response to an access request for a shared area which is not shared by its own node, and an acknowledge wait circuit 147 for waiting an acknowledge of a snoop command from another node. These circuits performs operations specific to the present invention.

Each node has an inter-OS communication function 170 to be used for system initialization process, configuration control, debug and so on. Without using the shared memory, system software of each node can perform communication. Physically, an inter-OS communication path 910 can also share the same hardware as the inter-node connection switch. Alternatively, the inter-OS communication path 910 can also use a typical network such as a LAN.

Figure 2:
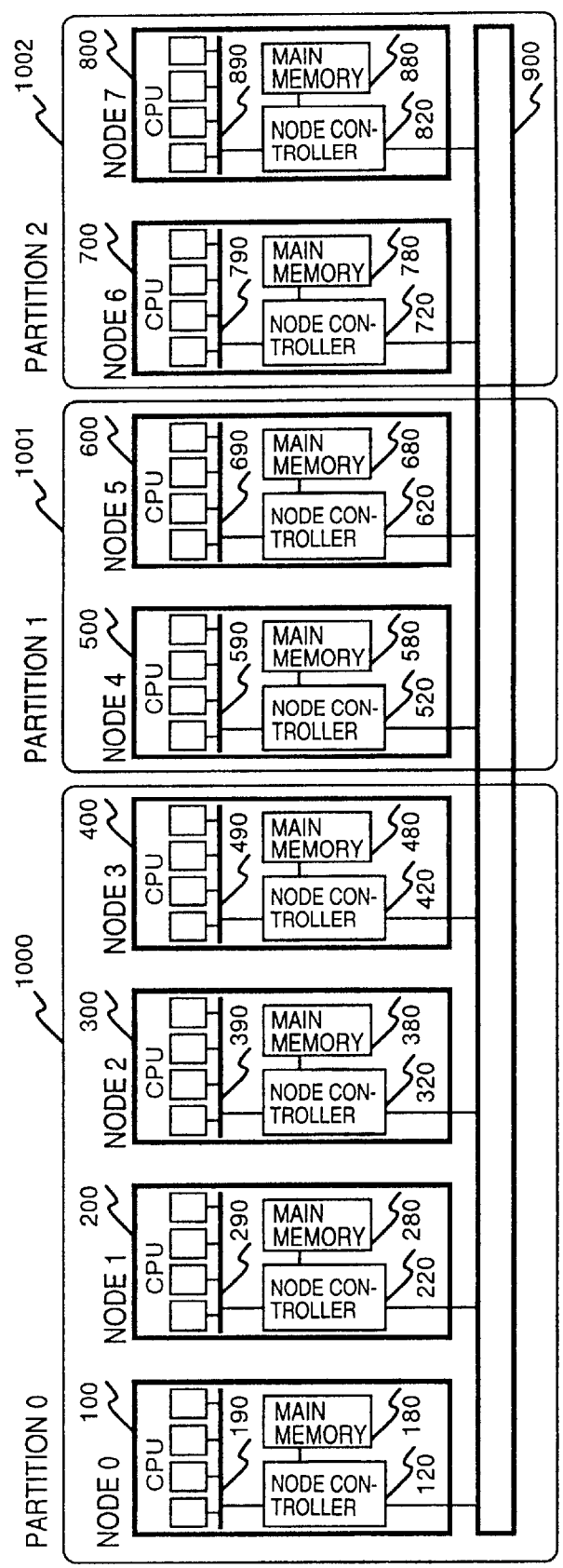
FIG. 2 shows an example of partitioning in a shared memory multiprocessor according to the present invention.

FIG. 2 shows a configuration example of partitioning in a hierarchical SMP of the present invention. Partitioning is conducted by taking a SMP node as the unit, and an arbitrary combination of nodes can be adopted. In the example shown in FIG. 2, the inside of the system is divided into three partitions. A first partition 1000 includes nodes 0 to 3 (100, 200, 300 and 400). A second partition 1001 includes nodes 4 and 5 (500 and 600). A third partition 1002 includes nodes 6 and 7 (700 and 800). Respective partitions are independent systems in that different OSs operate. Respective partitions have independent address spaces as hereafter described. In addition, partitions have a shared memory which is a part of the main memory and which is shared by partitions.

In the case where there is not a memory shared by partitions, exchange of data between partitions must be conducted by using a message communication mechanism or a typical network (LAN). Since the latency of message communication requires approximately at least 10 μs, it is difficult to realize high speed communication. If a hierarchical bus connection shared memory mechanism is utilized, however, communication between nodes can be realized in several hundreds ns or less. Therefore, the inter-partition shared memory is indispensable for realizing faster communication between partitions, faster resource lock processing between partitions, and faster fail over between partitions.

Figure 3:
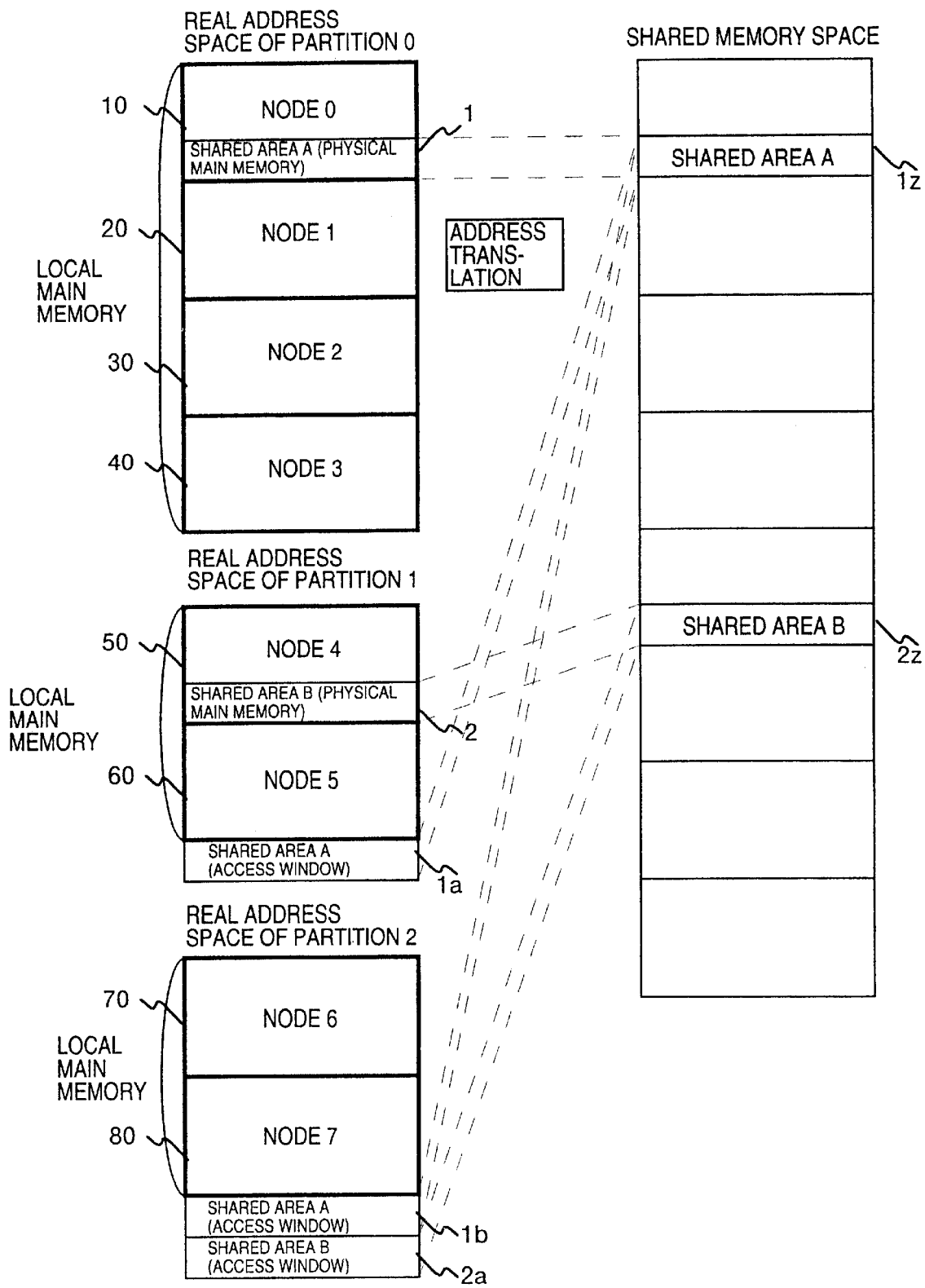
FIG. 3 shows an example of address spaces of respective partitions in a shared memory multiprocessor according to the present invention.

FIG. 3 shows an example of address maps of respective partitions in the case where a shared memory mechanism of partitions is used. This example corresponds to the partitioning exemplified in FIG. 2.

Respective partitions (partitions 0 to 2) have real address spaces which are independent from partition to partition (as shown on the left hand side of FIG. 3). Respective nodes in the same partition have the same real address space. The real address of the above described partition is the address used in the CPU bus 190 in nodes included in the partition. It is a real address to be used by the CPUs 110 to 113, the main memory 180 and the main memory access circuit 130 which are included in the node. In addition to the above described real address spaces of respective partitions, the system has a shared memory space (shown on the right hand side of FIG. 3) common to the whole system. An area shared by partitions have different addresses within the partitions, but has a common address in the shared memory space.

Access from each partition to a shared area is conveyed to another partition via a shared memory space address. In other words, an access command such as a cache coherent check command (CCC command) issued to a shared area by each node is transformed from the real address of its own partition to a shared memory space address when the access command is outputted from the accessing node. When the access command is inputted to an accessed node, the access command is transformed from the shared memory space address to a real address of an accessed partition. These address transformation operations are conducted by the address translation circuit 140 located at the gateway of each node. Owing to this address translation function, it is possible in each partition to freely determine a real address space which exceeds the range of the physical main memory of a node in its own partition.

It should be noted that in the case where the bus snoop protocol is used there is a possibility that a CCC command will be issued by an arbitrary CPU which shares a certain cache line and the CCC command might be broadcasted in some cases to all CPUS which may possibly share the pertinent line. Therefore, address translation conducted in each partition between the local real address of a partition and the shared space address must be translatable in both directions. Furthermore, also when accessing a shared area which has a physical main memory in the same partition (such as when one of the nodes 0 to 3 accesses a shared area A), an address in the CCC command must be translated to an address of the shared memory space once in order to correctly convey the CCC command to nodes located outside the partition as well. For access to a not-shared area (an area which is accessed by only nodes included in the partition), address translation is not conducted at all (the CCC command is sent to only the nodes included in the partition). At that time, it is impossible to determine on the basis of the address alone whether a command inputted from the switch is access to a not-shared space or access to a space shared by partitions. Therefore, each command in the switch has a global bit whereby it can be determined whether the command is access to a shared space.

In accordance with a feature of the present invention, the address translation circuit 140 is provided in the gateway of each node to the switch, and mutual translation between the address of a shared area in each node and its shared memory space address is conducted.

Hereafter, an address management scheme between partitions will be described in detail by referring to the example shown in FIG. 3. In FIG. 3, the address space of the first partition 1000 has local main memories 10, 20, 30 and 40 respectively of the nodes 0 to 3. The address space of the second partition 1001 has local main memories 50 and 60 respectively of the nodes 4 and 5 and a shared area 1a. The address space of the third partition 1002 has local main memories 70 and 80 respectively of the nodes 6 and 7 and shared areas 1b and 2a. All of the nodes included in each partition have the same address space. For example, both the nodes 4 and 5 can access the areas 50, 60 and 1a.

As for shared areas, there are two shared areas A and B. The shared area A is allocated onto the local main memory of the node 0, and the shared area B is allocated onto the local main memory of the node 4. They are represented as shared area A (physical main memory) 1 and shared area B (physical main memory) 2, respectively. Partitions having main memories corresponding to these shared areas are hereafter referred to as partitions of export side. On the other hand, in the shared memory space, the shared area A and the shared area B are located in 1z and 2z, respectively. Therefore, the partition 0 maps (exports) the shared area A from the real address space 1 in the partition to the shared memory space 1z, and the partition 1 maps (exports) the shared area B from the real address space 2 in the partition to the shared memory space 2z.

Furthermore, the shared area A is shared by the partition 1, the partition 2 and the partition 3. The shared area B is shared by the partition 2 and the partition 3. Like the partitions 2 and 3 for the shared area A and the partition 3 for the shared area B, a partition which has not a main memory of the pertinent area therein, i.e., a partition which accesses a physical main memory of the shared area included in another partition, is referred to as partition of import side. In the partition of the import side, an area (window) for accessing the main memory area included in another partition is formed in a portion of its own partition where a main memory of a real address is not mounted. Therefore, the partition 1 maps (imports) the shared area A from the shared memory space 1z to the real address space 1a in the partition. The partition 2 maps (imports) the shared area A from the shared memory space 1z to the real address space 1b in the partition, and maps (imports) the shared area B from the shared memory space 2z to the real address space 2a in the partition.

The foregoing description is summarized as follows. In the example of FIG. 3, the following (bidirectional) address translation operations are required at gateways of respective nodes.

The shared area A is exported from the main memory 1 in the node 0 to the shared memory space 1z.
Nodes 4 and 5 (the Second Partition 1001)

The shared area B is exported from the main memory 2 in the node 4 to the shared memory space 2z.

The shared area A is imported from the shared memory space 1z to the area 1a in its own partition.
Nodes 6 and 7 (the third partition 1002)

The shared area A is imported from the shared memory space 1z to the area 1b in its own partition.

The shared area B is imported from the shared memory space 2z to the area 2a in its own partition.

The address of each of not-shared areas which are not mentioned in the foregoing description is not translated even when a CCC command is outputted from a node.

FIG. 4 collectively shows address translation functions required at respective gateways of respective nodes in the present invention. Real addresses are divided into two classes, i.e., not-shared address (area which can be accessed from only the inside of a partition) and shared address (address shared by partitions). In addition, the shared addresses are divided into two classes, i.e., the case where there is a main memory in its own partition, and the case where there is not a main memory in its own partition.
(1) Not-shared Area As for the not-shared area which is accessed from only the inside of the partition, the address in partition is used in the switch as well. Therefore, address translation at the gateway of the node is not conducted. The snoop command is multicast only to nodes in the partition.
(2) Shared Area (Export Side)

As for a shared area having a physical main memory in the partition, translation between the address of the main memory in the own partition and the address of the shared memory space in the switch is required. The snoop command is sent to all nodes. Such optimization that the snoop command is sent to only nodes of sharing partitions is also possible.
(3) Shared Area (Import Side)

As for a shared area having no physical main memory in the partition, translation between the address of a window for accessing a shared area in the own partition and the address of a shared memory space in the switch is required. The snoop command is sent to all nodes. In this case as well, such optimization that the snoop command is sent to only nodes of sharing partitions is also possible.

Furthermore, in order to realize the fault containment between partitions, unauthorized access between partitions is checked. In ordinary highly multiplexed SMP, access authority check is conducted at the time of address translation when the CPU translates a virtual address to a real address. Assuming that the system software of an OS or the like of another partition runs away, however, access authority check on the CPU side which issues the access is not enough, but it is necessary to conduct access authority check in the accessed partition. Furthermore, since the cache coherence management using the bus snoop protocol is conducted between CPUs, not only data in the main memory but also data cached in the cache must be protected from unauthorized access. In order to realize the above described check, the following check is conducted at the entrance of each node on a CCC command which has arrived from another node.
(1) Not-shared Area Commands from nodes located outside the partition are not authorized.
(2) Shared Area (Both the Export Side and the Import Side)

In the address translation hardware, there is provided means for storing nodes authorized to share each shared area (i.e., nodes sharing the area) in a bit map form. Commands from nodes which are not authorized to share the shared area are not accepted.

The address translation heretofore described is dynamically set by system software such as an OS or middle software when the shared memory is allocated. The scheme of setting will be described later.

Hereafter, the configuration of a shared memory multiprocessor which realizes the inter-partition shared memory mechanism and the inter-partition address translation heretofore described will be described in detail.

With reference to FIG. 1, the address translation circuit 140 is disposed at the gateway of each node, to be concrete, between the main memory access circuit 130 and the inter-node connection switch 900. The address translation circuit 140 is a circuit for conducting address translation inside and outside the node, destination specification of a CCC command sent to the outside of the node, and error check for a CCC command sent from the outside of the node, on the basis of information written in the address translation table 150, the partition configuration information 160, and the main memory configuration information in partition 165.

The address translation table 150, the partition configuration information 160, and the main memory configuration information in partition 165 have been subjected to memory mapping. The processors in the partitions can access them.

Figure 5:
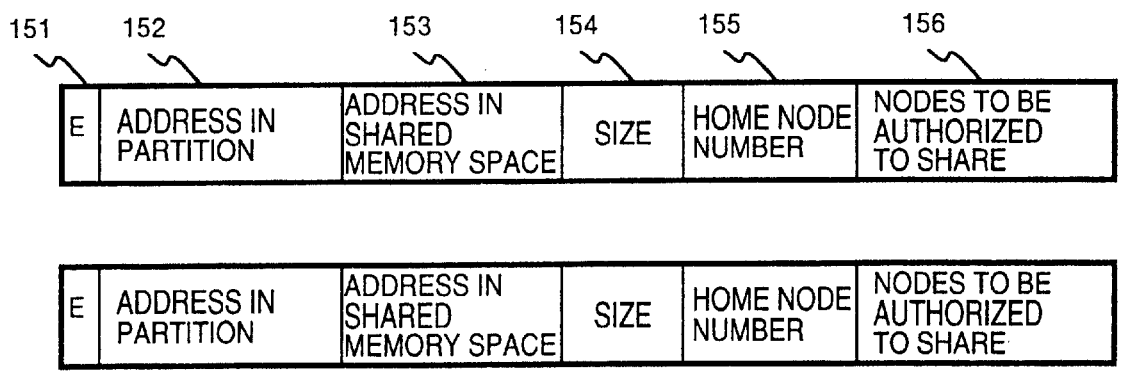
FIG. 5 shows the configuration of an address translation table of each node.

FIG. 5 shows the format of an entry of the address translation table 150. In order to conduct address translation on the shared area, the address translation table has one entry shown in FIG. 5 per shared area. The address translation circuit conducts full-associative bidirectional address translation. Therefore, the number of shared areas exported and imported by a certain node is limited by the number of entries of the address translation table. As a result, the number of entries of the address translation table must be sufficiently large. Each entry has the following information.

"Enable bit" (E) 151

The entry is made valid.

"Address in partition" 152

"Address in shared memory space" 153

(These two addresses are respective start addresses.)

"Size" 154

Size of shared space

"Home node number" 155

Number of a node having the pertinent shared area in the main memory

"Nodes to be authorized to share" 156

A list of node numbers authorized to share the pertinent area (stored in a bit map form).

(Whether nodes are authorized to share is determined by taking a partition as the unit. With due regard to the processing efficiency, storage is conducted in the present table by taking a node number as the unit.)

Here, the shared memory is handled every certain fixed unit (such as 1 MB). In that case, fields 152 to 154 become multiples of 1 MB. Therefore, twenty low-order bits of the fields 152 to 154 are fixed to 0. Bits of the table are not mounted.

FIG. 7 shows details of the partition configuration information 160. The partition configuration information 160 shows how the system is partitioned. The partition configuration information 160 is formed of a bit map 161 showing which nodes are included in which partition, and a flag 162 showing which partition its own node is housed. The number of entries of the table is the total number of nodes of the system. Therefore, up to the case of one node/one partition can be supported. FIG. 7 shows values of the partition configuration information 160 in the nodes 0 to 3 illustrated in FIG. 2. In other words, in this example, the partition 0 is its own partition, and the partitions 3 to 7 are not used. In other nodes as well, the same information is stored except the local partition flag 162.

FIG. 8 shows details of the main memory configuration information in partition 165. The main memory configuration information in partition indicates the address range the local main memory of each of the nodes included in the own partition takes charge of. The main memory configuration information in partition does not have information of other partitions. The number of entries is the total number of nodes of the system. Up to the case where the whole system is formed of one partition can be supported. The main memory configuration information in partition includes a start address 166 and an end address 167 of the main memory each node takes charge of, and a V bit 168 indicating that the entry is valid.

Commands exchanged by the inter-node connection switch 900 will now be described. In the hierarchical SMP, data reading/writing (cache coherent check: CCC) of each CPU is managed by the bus snoop protocol. As for the bus protocol in the node, a known technique is adopted. As for the CCC between nodes as well, a known technique is used. Here, as an example of the CCC between nodes, outline of a procedure of the bus snoop using a fetch command between nodes will now be described. For the purpose of description, it is now assumed that partitioning is not conducted. In other words, it is now assumed that the whole system is formed of one partition.

(1) In the case where a certain CPU reads data, the fetch command is issued to all other nodes (all CPUs and the main memory of the home node).

(2) If there is modified data (latest data) in the cache in the own node, the node which has received the fetch command returns that data. Otherwise, the node which has received the fetch command replies that there are no modified data. If there are no modified data in the cache, the home node returns data in the main memory.

(3) In the accessing node, replies from other nodes are totalized. If modified data in the cache is sent from another node, the data is returned to the accessing CPU. If every node does not have modified data, data returned from the main memory (data of the main memory in the own node in the case where the own node is the home node) is returned to the accessing CPU. For determining whether data returned from the main memory should be used, it is necessary to wait the reply "there are no data" from all nodes.

Hereafter, CCC commands used on the bus within the nodes of the hierarchical SMP will be described. Characters enclosed in parentheses are abbreviations used in the embodiment.

Fetch (F)

It requests line transfer of data.

It is issued in the case where a read command of the CPU has failed.

Fetch&Invalidate (FI)

It requests invalidation of data on other caches simultaneously with the line transfer of data.

It is issued in the case where a read command of the CPU has failed.

Invalidate (I)

It requests invalidation of data on other caches. It is issued in the case where the CPU has issued a write request to a cache line shared with other caches.

WriteBack (WB)

It requests writeback of a cache line.

It is issued when data has been turned out by replacement.

Data (D)

It is a command for returning data in response to the F or FI command in the case where there is modified (latest) data in the cache.

DataMem (DM)

It is a command for returning data in the main memory of the home node in response to the F or FI command. In the home node, it is returned in the case where there are no modified (latest) data in the cache within the node. In the case where a D command has come from any other node, data returned by the DM command is ignored. (Data in the cache is given priority.)

It is also used for the reply to UncachedRead.

NoData (ND)

It is returned in response to the F or FI command in the case where there are no modified (latest) data in the cache of the pertinent node (except the home node).

DummyNoData (DND)

A reply returned from a node located outside the partition in response to the F or FI command.

(DND is not an ordinary CCC command, but it is a command required in implementation specific to the present embodiment. Its meaning is the same as that of ND.)

UncachedRead (UR)
UncachedWrite (UW)

It is a command for directly accessing the main memory in cache off.

A command in the inter-node connection switch has the following fields specific to the present invention besides fields required for CCC, such as command, address, and data.

(1) Destination Node Number

The destination node number is represented by a bit map. By virtue of representation of destination using a bit map, it is possible to easily realize multicast directed to a plurality of specific nodes, such as nodes in the partition, by setting a plurality of bits and further broadcast directed to all processors of the system by setting all bits.

(2) Global Bit

It is a bit for determining whether the pertinent access command is a command for a shared area (hence the address is an address of the shared memory space) or a command for a not-shared area (hence the address is a local address in the partition).

Hereafter, operations of the address translation circuit in the case where a command is issued to another node, and in the case where a command has been received from another node will be described separately for respective cases and successively.

(A) Processing in the Case where a Command is Issued from a Node

If a CCC command is delivered from the main memory access circuit 130 to the address translation circuit, it is first inputted to the shared area detect circuit 141.

FIG. 9 shows details of the shared area detect circuit 141. From an inputted command 141c, a part of an access address 1410b is taken out. The access address 1410b is inputted to circuits 1410 and 1411.

In the circuit 1410, it is detected by using the main memory configuration information in partition 165a whether the access address 1410b is included in any of main memories within the local partition or not. In other words, it is checked for every bit having the valid bit 168 of FIG. 8 set equal to 1 whether the access address 1410b is located between the start address 166 and the end address 167. If the access address is included in any of the main memories, then "1" is outputted to output 1410a and the access address 1410b is judged to be an address having a main memory in the partition. Since the internal circuit is the same as that of FIG. 6, detailed description thereof will be omitted.

In the circuit 1411, it is detected by using the information 150a of the address translation table whether the access address 1410b is included in any of partitions' shared areas defined in the address translation table or not. In other words, it is checked for every bit having the E bit of FIG. 5 set equal to "1" whether the access address 1410b is included between the "address in partition" 152 and the "size" 154. If the access address is included in any of the partitions' shared areas, then "1" is outputted to output 1411a, and the access address 1410b is judged to be one of shared areas exported from the inside of the partition or imported from the inside of the partition.

If a gate 1412 outputs "1", i.e., if the access address 1410b has a main memory in the partition, but it is not a shared area exported or imported, then the access command is distributed to a not-shared side 141b by a gate 1413. Otherwise (i.e., if the output of the gate 1412 is "0"), i.e., the access address 1410b does not have a main memory in the partition, or it is an exported or imported shared area, then the access command is distributed to a shared side 141a.

On the not-shared side 141b, the access command is sent to the destination indicate and global bit addition circuit 142 without being subject to address translation. As a result, address translation is not conducted on the access command sent to the not-shared area.

Figure 6:
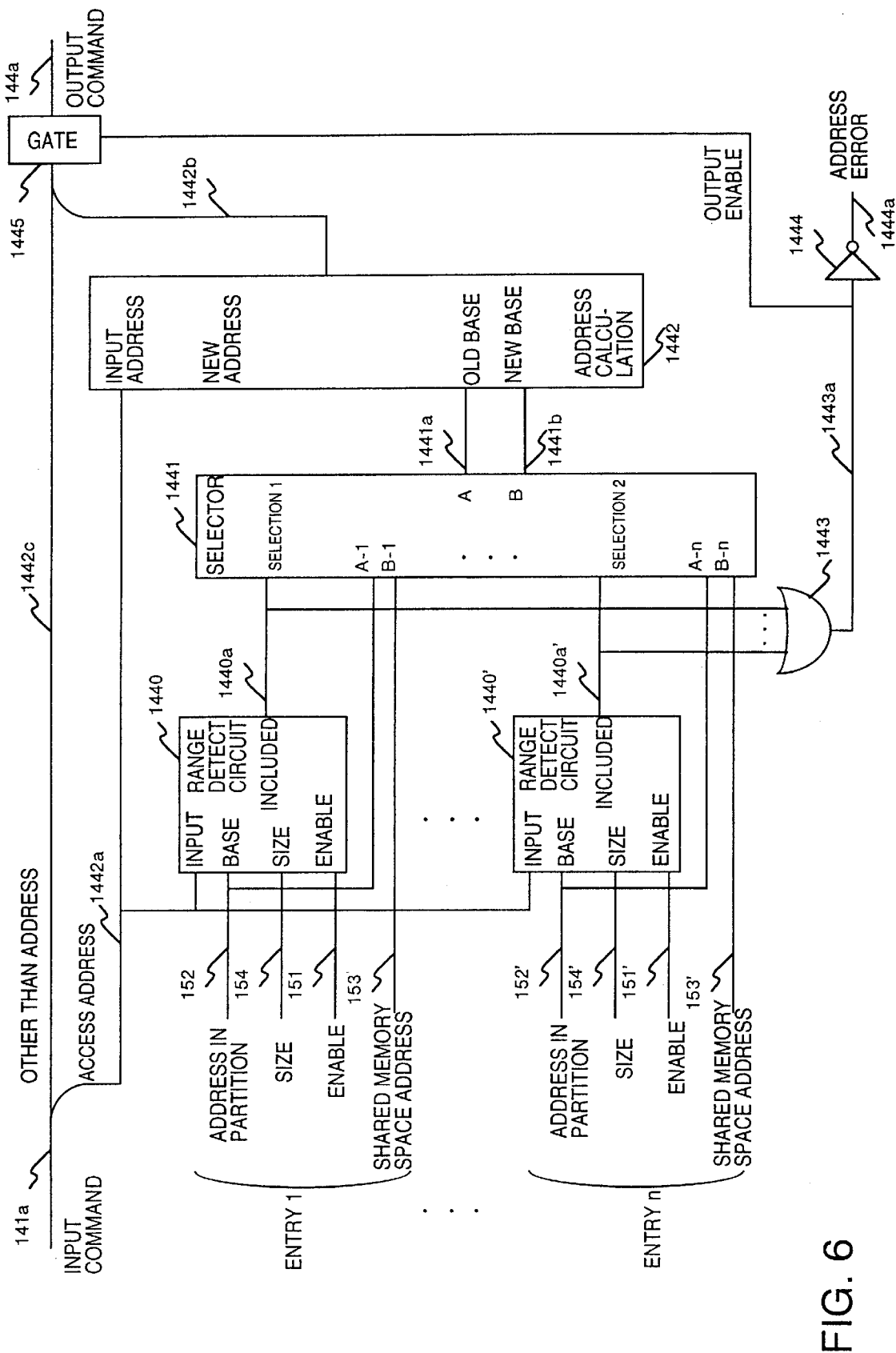
FIG. 6 shows a detailed diagram of an output side translator of each node.

On the other hand, on the shared side 141a, the access command is inputted to the output side translator 144. FIG. 6 shows details of the output side translator 144. From an inputted command 141a, an access address 1442a is separated. It is determined by a range detect circuit 1440 whether the access address 1442a is included in the "address in partition" 152 to the "size" 154 of a valid entry of the address translation table. The range detect circuit is provided at the rate of one per entry of the address translation table (1440 to 1440'). If the access address 1442a is included in the range of address in the partition of the address translation table, then a signal 1440a is outputted. If the signal 1440a is "1", then the "address in partition" 152 of a pertinent address translation table is outputted to an output A 1441a, and the "address in shared memory space" 153 is outputted to an output B 1441b. In an address translation circuit 1442, a new address 1442b is calculated according the following equation by using an old base address 1441a outputted from the signal A (corresponding to the address in partition in the address translation table), a new base address 1441b outputted from the signal B (corresponding to the shared memory area address in the address translation table), and the input address 1442a.

New Address=Input Address−Old Base Address+New Base Address

By virtue of this calculation, the input address issued from the inside of the partition (local real address of the partition) can be relocated to an address of the shared memory space. Also in the case where the access address has been included in another entry, similar processing is advanced via the range detect circuit 1440'. Together with a part of the command other than the address, the output address 1442b is sent to the destination indicate and global bit addition circuit 142 via a gate 1445 (enabled by an OR 1443a of selection signals). If the input address 1442a does not match with any of entries of the address translation table, then an error is detected.

The destination indicate and global bit addition circuit 142 determines which node a command outputted from the inside of the node should be outputted to, and in addition determines the value of the global bit in the command. FIG. 10 shows operation of the destination indicate and global bit addition circuit 142. The circuit conducts predetermined operation according to the kind of the command and whether the command is a command directed to a not-shared area (in the case where the command is inputted from the signal 141b side) or a command directed to a shared area (in the case where the command is inputted from the signal 144a side).

(1) Snoop Request (F, FI, I) Command on not-shared Address

After the node configuration in the partition is derived from the partition configuration 160, the command is multicast to nodes in the partition.

(2) Snoop Request (F, FI, I) Command on Shared Address

The command is broadcasted to all nodes of the system. The global bit is set equal to "1".

(3) Main Memory Access (WB, UW, UR) Command on not-shared Address

On the basis of the main memory configuration information in partition 165, comparison is conducted to determine which node takes charge of the address range the access address belongs to. The home node (in the local partition) of the access address is derived, and thereafter the command is sent to the home node.

The global bit is set to "0".

(4) Main Memory Access (WB, UW, UR) Command on Shared Address

From the address translation table, the "home node number" 155 of the access address is derived. The command is sent to the home node.

The global bit is set to "1".

(5) Acknowledge (D, DM, ND) Command on not-shared Address

The command is returned to the requesting node. (DND to a not-shared area is not generated.)

The global bit is set to "0".

(6) Acknowledge (D, DM, ND, DND) Command on Shared Address

The command is returned to the requesting node.

The global bit is set to "1".

Owing to the processing heretofore described, the command outputted from the node can be transmitted to suitable destination via the inter-node connection switch 900.

(B) Processing Conducted when a Node has Received a Command

Figure 11:
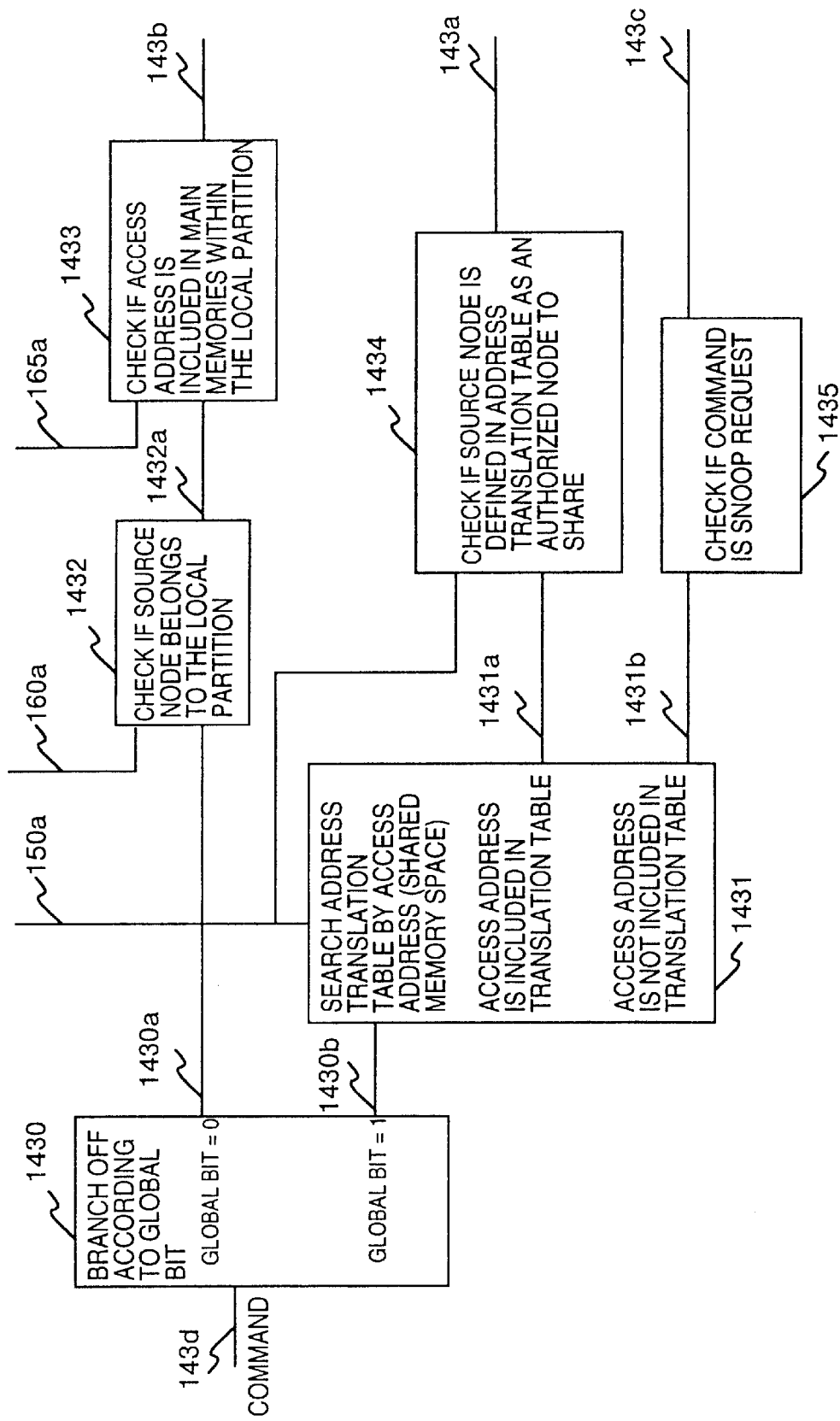
FIG. 11 shows a detailed diagram of a shared area detect and address check circuit of each node.

If a command inputted from the inter-node connection switch 900 is inputted to the address translation circuit 140, then the command is first inputted to the shared area detect and address check circuit 143. In the shared area detect and address check circuit 143, classification of an inputted command and error check are conducted. FIG. 11 shows details of the shared area detect and address check circuit 143. A command 143d sent from another node is first inputted to a circuit 1430. The value of the global bit is examined.

If the global bit is "0", i.e., in the case of access to a not-shared area, the command is outputted to a signal 1430a. Thereafter, in circuit 1432, it is checked on the basis of the partition configuration information 160 whether the source node belongs to the local partition. Thereafter, in a circuit 1433, it is checked on the basis of the main memory configuration information in partition 165 whether the access address is included in main memories of any node in the local partition. A command which has not posed a problem in both checks in the circuits 147 through a signal 143b. In this case, address translation is not conducted. A command which has posed a problem in the check of either 1432 or 1433, i.e., access from the outside of the partition or access to the outside of the main memory in the partition is detected as an error. As a result, unauthorized access to a not-shared area in the partition can be prevented.

Processing conducted in the case where the global bit is "1", i.e., in the case of access to a shared area will now be described. The access command is sent to a circuit 1431 through a signal 1430b. In the circuit 1431, it is checked whether the access address is included in the range of the "address in shared memory space" 153 to the "size" 154 of any of entries of the address translation table 150 (i.e., whether the access address is included in any of shared areas exported or imported by the partition this node belongs to).

If there is the pertinent entry in the address translation table, i.e., if the access address is an address shared by a partition this node belongs to, the command is conveyed to a circuit 1434 through a signal 1431a. The DND is returned from a not-shared node. On the other hand, in the case of a command other than the DND, it is checked in the circuit 1434 whether the source node of the access command is included in the bit map 156 of the address translation table representing nodes to be authorized to share the pertinent entry. If there is no problem as a result of the check, the command is sent to the input side translator 145 through a signal 143a. In other words, translation from the shared area address to the real address in the partition is conducted.

If there is a problem as a result of the check in the circuit 1434, i.e., if access is conducted from a node other than partition authorized to share the pertinent shared area (except the DND), then it is detected as an error. As a result, unauthorized access to a shared area in the partition can be prevented.

If there is the pertinent entry in the address translation table, the access address is not included in the shared main memory shared by the partition this node belongs to. This case occurs because in the destination indicate and global bit addition circuit 142 which has transmitted the command, the snoop request command (F, FI, I) on the shared area is broadcasted uniformly to all nodes. Therefore, the command is also sent to nodes which are not included in the sharing nodes. In this case, a DND command indicating that there is no pertinent data in the node must be returned to the access node in order to correctly wait acknowledge to the snoop request. (The access node anticipates acknowledges from all nodes to which the command has been broadcasted.) After being checked in a circuit 1435 that the access command is a snoop request, therefore, the access command is conveyed to the DND acknowledge circuit 146 through a signal 143c. (if the access command is not a snoop request, an error is reported.) In the DND acknowledge circuit 146, the DND command is issued to the source node. The DND command is returned to the accessing node through the destination indicate and global bit addition circuit 142.

Operation of the input side translator 145 will now be described. In the input side translator, the shared memory space address in the command is translated to a real address in the partition on the basis of information of the address translation table 150. The input side translator has the same internal configuration as that of the output side translator. The input side translator is different only in the translation direction from the output side translator.

Finally, operation of the acknowledge wait circuit 147 will now be described. The acknowledge wait circuit 147 is a circuit for totalizing acknowledges (D, DM, ND, DND) to F and FI commands which request readout of data from another node. The acknowledge wait circuit 147 does not influence other commands. The acknowledge wait circuit 147 waits until acknowledges (D, DM, ND, or DND) come from all nodes which have issued F or FI commands, i.e., all nodes of the system in the case of shared areas, and all nodes in the partition (indicated by the partition configuration information 160) in the case of not-shared areas. Then the acknowledge wait circuit 147 conducts the following judgments.

(1) In the case where the D command has been returned:
If the D command has been returned from one node, and ND, DND, or DM has been returned from another node, then the latest data read out by the D command, i.e., data modified in the cache of another node is returned.

(2) In the case where the DM command has been returned:
If the DM command has been returned from one node, and ND or DND has been returned from another node, then data in the main memory read out by the DM command is returned.

(3) In the case where the ND command has been returned:
If ND or DND has been returned from another node, then the own node is the home node. A reply that there are no data is returned. Thereafter, the main memory access circuit 130 reads out data in the main memory 180 and returns the data.

The operation of the acknowledge wait circuit 147 heretofore described is the same as that of the cache coherent check circuit of the conventional hierarchical SMP. Therefore, details of the internal configuration will be omitted.

How access to another node is conducted in the shared memory multiprocessor of the present invention heretofore described will hereafter be described by taking the F command as an example.

(1) F Command on Not-shared Area

In a node which has issued the F command, the F command outputted from the inside of the node is sent from the shared area detect circuit 141 to the destination indicate and global bit addition circuit 142 through the signal 141b (address translation is not conducted), and multicast to nodes in the partition (global bit=0).

In the node which has received the F command, error check is conducted in the shared area detect and address check circuit 143, and thereafter the F command is conveyed to the inside of the node through the signal 143b and the acknowledge wait circuit 147 (address translation is not conducted).

The acknowledge (D, DM, ND) for the F command is sent from the shared area detect circuit 141 to the destination indicate and global bit addition circuit 142 through the signal 141b (address translation is not conducted), and returned to the accessing node (global bit=0).

In the accessing node which has received the acknowledge for the F command, error check is conducted in the shared area detect and address check circuit 143, and thereafter the acknowledge is conveyed to the acknowledge wait circuit 147 through the signal 143b (address translation is not conducted). In the acknowledge wait circuit 147, replies from all nodes in the partition are waited, and are returned to the accessing CPU.

(2) F Command on Shared Area

In the node which has issued the F command, the F command outputted from the inside of the node is sent from the shared area detect circuit 141 to the destination indicate and global bit addition circuit 142 through the output side translator 144. In this process, the access address is translated from the real address of the accessing partition to the address of the shared memory space. The F command is broadcasted to all nodes of the system (global bit=1).

If the node which has received the F command is included in a partition sharing the accessed shared area, then the F command is subjected to error check in the shared area detect and address check circuit 143, and thereafter the F command is conveyed to the acknowledge wait circuit 147 through the input side translator. In this process, the access address is translated from the address of the shared memory space to the real address of the accessed partition. Thereafter, the F command is conveyed to the inside of the node. Snoop in the node is conducted by using the local real address of the accessed partition.

The acknowledge (D, DM, ND) for the F command generated as a result of the above described process is sent from the shared area detect circuit 141 to the destination indicate and global bit addition circuit 142 through the output side translator 144. In this process, the access address is translated from the real address of the accessed partition to the address of the shared memory space again. The command is returned to the accessing node (global bit=1).

If the node which has received the F command is not included in the partition sharing the accessed shared area, then the F command is conveyed to the DND acknowledge circuit 146, and a DND command is returned to the accessing node (global bit=1).

In the accessing node which has received the acknowledge (D, DM, ND, DND) for the F command, error check is conducted in the shared area detect and address check circuit 143, and thereafter the acknowledge is conveyed to the acknowledge wait circuit 147 through the input side translator 145. In this process, the access address is restored from the address of the shared memory space to the real address of the accessing partition. In the acknowledge wait circuit 147, replies from all nodes of the system are waited, and the replies are returned to the accessing CPU. Answering is conducted by using the local real address of the accessing partition.

As heretofore described, owing to the address translation mechanism of the present invention, data can be accessed by using the local real address in the partition in both the accessing node and the accessed node.

How the system software such as the OS manages the shared memory among partitions of the shared memory multiprocessor in the present invention will now be described. The OS itself may manage the shared memory among partitions, or system software for managing the shared memory among partitions, such as middleware other than the OS, may manage the shared memory among partitions.

In the present system, the partitions do not have a shared memory at all when the system is initialized. Communication between partitions is conducted by using inter-OS communication means (170 and 910). Every inter-partition communication for shared memory management hereafter described is conducted by using this inter-OS communication means.

Hereafter, a node having a physical main memory of a shared memory (a node which exports the shared memory is referred to as home node. A partition the home node belongs to is referred to as home partition. Hereafter, with reference to FIGS. 12 to 16, the procedure of the operation of the system software will be described in detail by dividing it into allocation of a shared area in the main memory, addition of a shared partition, and erasing of a shared area.

As for the management of the shared area, it is hereafter assumed that the home partition basically conducts concentrated management. Also in the case where some unit other than the home partition conducts the management, the management can be realized by using the similar technique.

(A) Allocation of the main memory of the shared area

Figure 12:
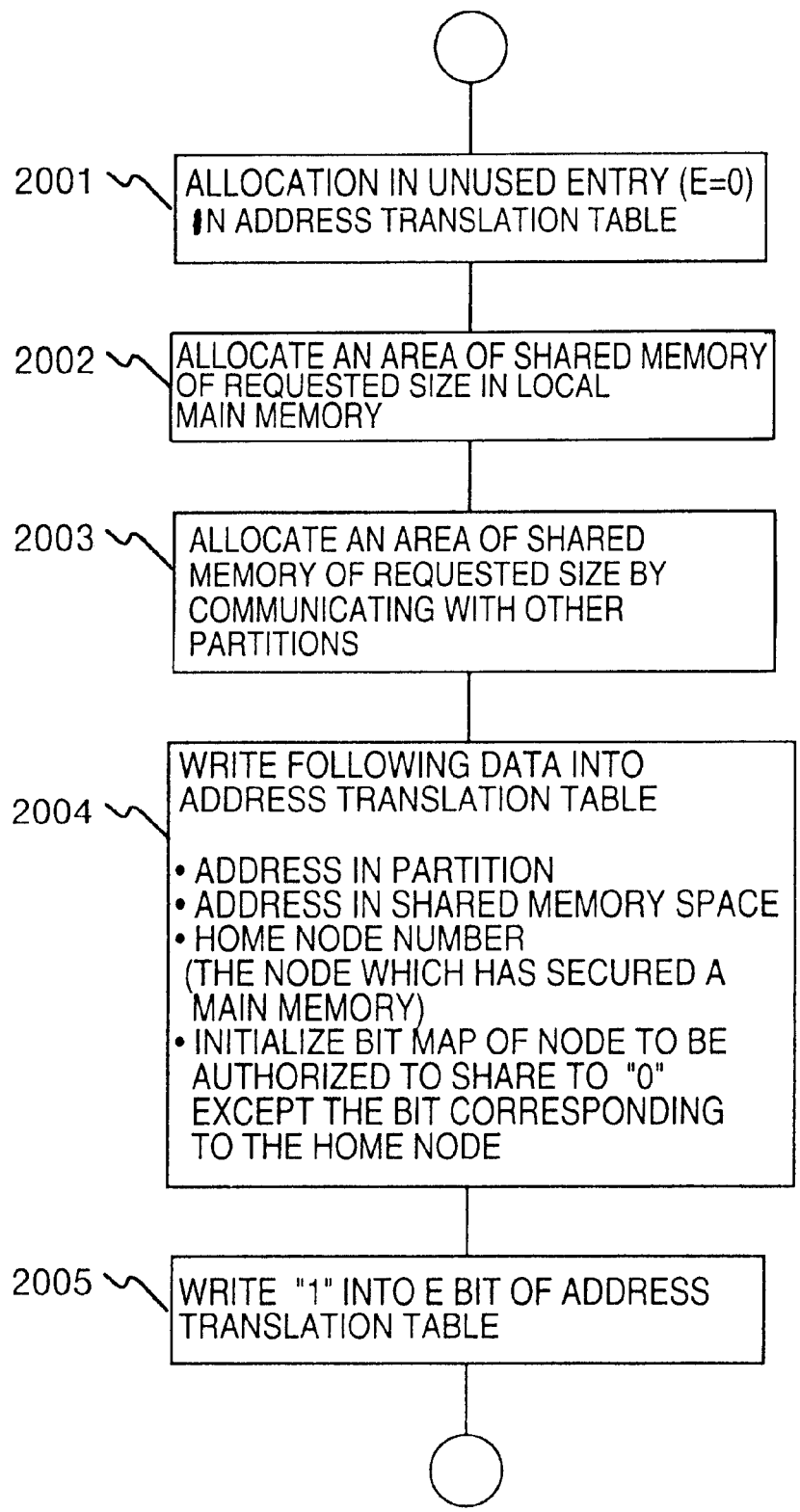
FIG. 12 shows a flow diagram showing a process conducted when a home partition ensures a sa in memory in a multiprocessor system of the present invention.

Allocation of the main memory of the shared area is conducted in the home partition (FIG. 12). A main memory of a requested size is allocated to be used as a shared area, and necessary data are written into the address translation table. The shared area can be dynamically allocated.

First, an unused entry (an entry having E=0) in the address translation table of each node in the partition is allocated (step 2001). A real memory of the requested size is allocated in the local main memory (step 2002). Thereafter, the system software communicates with system software of other partitions, and allocate an area of the requested size in the shared memory space (step 2003). In all partitions, the shared memory must have the same address map.

Subsequently, the following data concerning the shared area are written into the address translation table of each of nodes in the partition (step 2004).

"Real address in partition" 152 (start address)

"Address in shared memory space" 153 (start address) "Size of shared area" 154

"Home node number" 155 (number of node which has secured a main memory)

"Bit map of node to be authorized to share" 156 (initialize it to 0)

At this time point, access authority to the shared area is not given to any partition. Thereafter, "1" is written into E bit of the address translation table of each bode in the partition, and the entry is made valid (step 2005).

By the processing heretofore described, an area in the main memory can be exported. It becomes possible to access the shared area allocated in the step 2002 from the address in the shared memory space allocated in the step 2003.

It should be noted here that the same content must be written into address translation tables of all nodes in the partition.

(B) Addition of Sharing Partition

For making it possible for other partitions to access the shared area allocated in (A) (i.e., to import the shared area), the following procedure is necessary. The import processing of the shared area can be dynamically conducted at arbitrary time after the shared area is allocated in the home partition.

(B1) Partition which Newly Imports Shared Area

Figure 13:
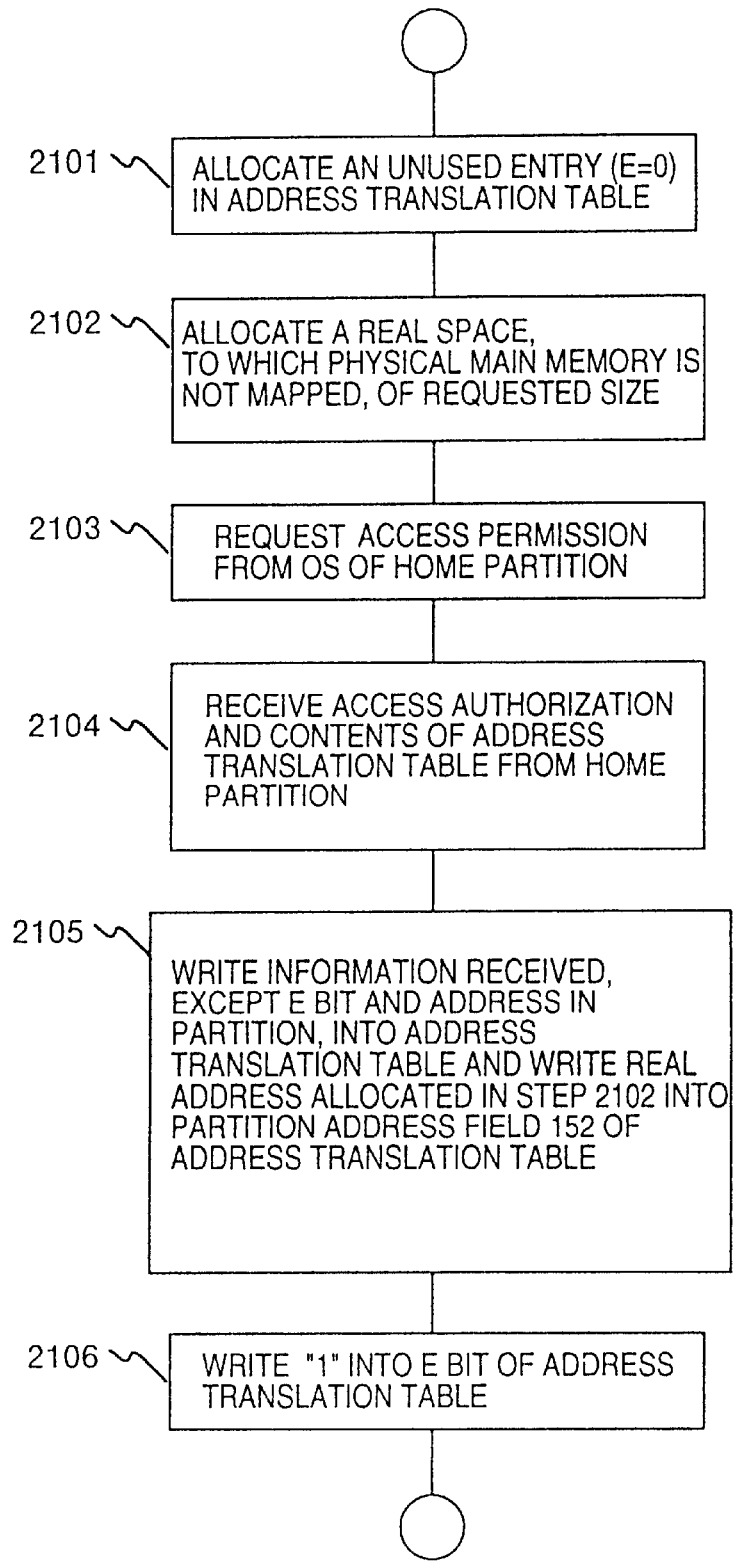
FIG. 13 shows a flow diagram showing a process conducted on an added partition side when a shared partition is added in a multiprocessor system of the present invention.

In a partition of import side which is going to newly share a certain shared area, the following processing is necessary (FIG. 13).

First, an unused entry (an entry having E=0) in the address translation table of each node in the partition is allocated (step 2101). A real space, to which a physical main memory is not mapped, of a requested size is allocated (step 2102). This real space is used as a window for accessing a shared area having a physical main memory in another partition. Thereafter, access permission of a pertinent shared area is requested from the system software of the home partition (step 2103). Here, in a partition which newly imports the shared area, the home node conducts processing of steps 2201 to 2206 (which will be described later) and waits return of a reply of access authorization.

Thereafter, if access authorization comes from the home partition, an entry concerning the shared area of the address translation table sent together with access authorization is received (step 2104). Contents of the entry of the address translation table received in the step 2104 (except the E bit and address in the partition) are written into the address translation table of each of nodes in the partition, and the real address allocated in step 2102 is written into the "address in partition" field 152 of the address translation table of each of nodes in the partition (step 2105). Finally, "1" is written into the E bit of the address translation table of each of nodes in the partition.

By the processing heretofore described, import of 10 the shared area is completed, and it is possible to access the shared area in the home node from the real address allocated in the step 2102.

(B2) Home Partition

Figure 14:
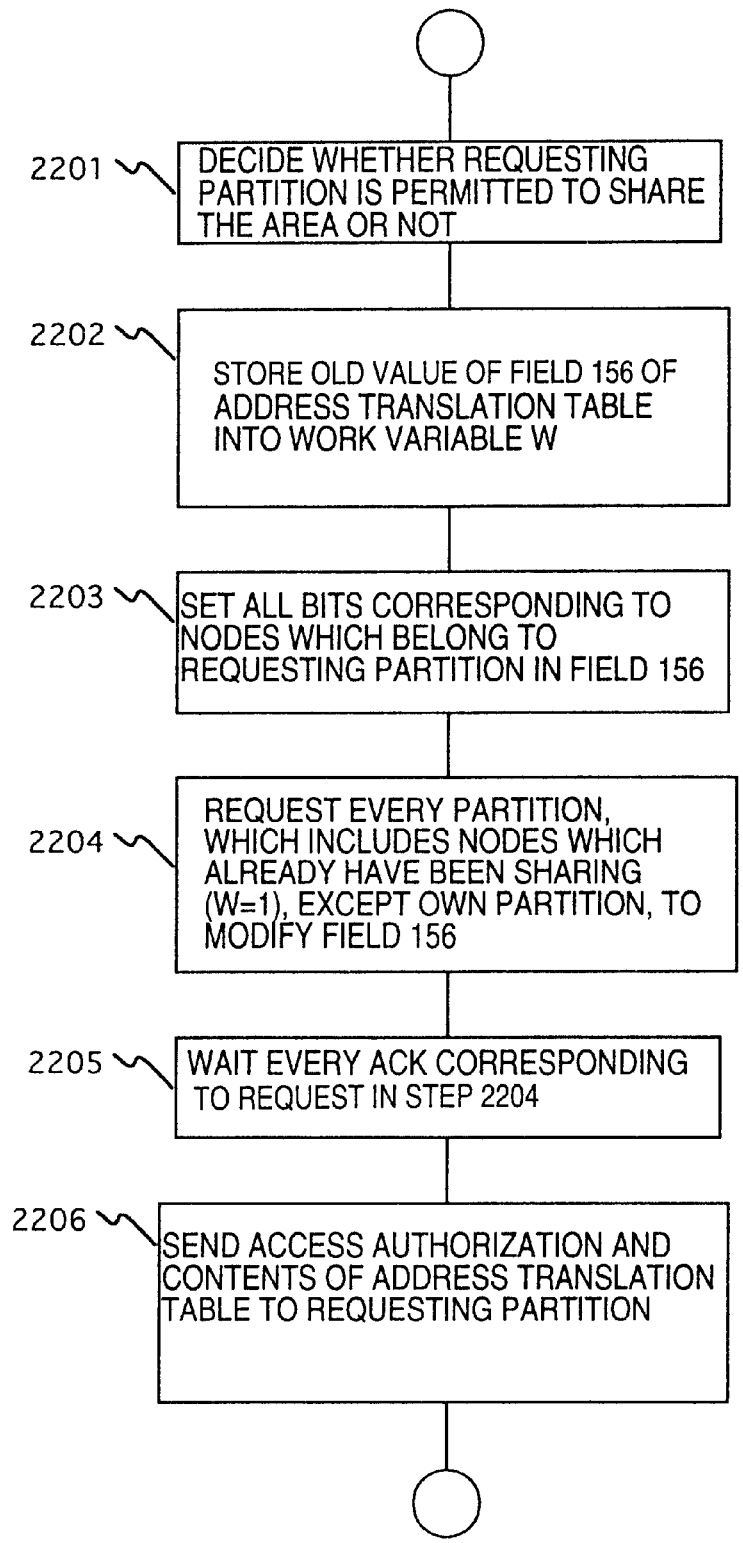
FIG. 14 shows a flow diagram showing a process conducted on a home partition side when a shared partition is added in a multiprocessor system of the present invention.

In the system software of the partition requested 15 to permit access to the shared area in the step 2103, processing described hereafter becomes necessary (FIG. 14). First the access request is checked, and it is decided whether the requesting partition is permitted to share the pertinent shared area (step 2201). Hereafter, a procedure in the case where the access is permitted will be described.

Subsequently, an old value of the "nodes to be authorized to share" field 156 of an entry corresponding to the shared area of the address translation table is stored into a work variable W (step 2202). In the "nodes to be authorized to share" field 156 of an entry corresponding to the shared area of the address translation table possessed by each of nodes in the partition, bits corresponding to all nodes which belong to the requesting partition are set (step 2203). As a result, the requesting partition is authorized to share the pertinent shared area.

Furthermore, the new value of the "nodes to be authorized to share" field 156 is sent to each of partitions (except the own partition) which includes nodes having W set equal to 1, and each of the partitions is requested to modify the field (step 2204). It should be here noted that the system software which manages shared areas is one in number every partition and each partition needs only to be requested once. Arrival of ACK telling that modification of the "nodes to be authorized to share" field 156 has been completed, from every partition requested in the step 2204 is waited (step 2205).

Finally, the entry of the shared area of the address translation table is sent to the requesting partition together with the access authorization of the shared area (step 2206).

By virtue of the processing heretofore described, the "nodes to be authorized to share" field 156 in the address translation table of every node which shares the pertinent shared area is updated, and the requesting partition can share the area.

(B3) Partitions which have Shared the Pertinent Area Until then (Except Home Partition)

In the partitions which have shared the pertinent area until then (except the home partition), the request issued by the home partition in the step 2204 is received, and the "nodes to be authorized to share" field 156 of an entry corresponding to the shared area of the address translation table possessed by each of nodes in the partition is updated. Upon completion of updating, the ACK is returned to the home partition.

(C) Erasing of Shared Area

Erasing of a shared area is started by the home partition, and all partitions which have shared the shared area execute a procedure hereafter described, in cooperation. Erasing of a shared area can also be conducted dynamically. After the shared area has been erased once, resources, such as the resource address translation table, the main memory, and the shared address space, which have been used until then can be utilized again.

It is assumed in the processing hereafter described that the application program has finished the use of the pertinent shared area. Therefore, access to the shared area to be opened is not caused.

(C1) Processing in Home Partition

The home partition makes all other partitions sharing the pertinent area erase the shared area, and thereafter erases the shared area of its own partition.

First, the home partition requests every partition which includes nodes corresponding to 1 in the "nodes to be authorized to share" field 156 of the address translation table (except its own partition) to erase the shared area (step 2301). And the home partition waits for every requested partition to return the ACK (step 2302). As a result, it is assured that the shared area has been erased in the partitions which imported the shared area.

Subsequently, the home partition purges all data of the shared area to be erased, in caches of all processors in its own partition (step 2303). Old data in the cache are thus driven out. Thereafter, the home partition invalidates the entry (i.e., writes "0" in the E bit) corresponding to the shared area to be erased, in the address translation table of every node in the partition (step 2304). The home partition releases the area in the shared memory space and the physical memory of the shared area (step 2305). Finally, the home partition purges the TLB of every processor in the partition (step 2306). By virtue of the processing heretofore described, resources used to access the shared area can be completely released.

(C2) Processing in Partitions which Import Shared Area

In each partition requested to erase the shared area by the home partition in the step 2301, processing heretofore described becomes necessary.

First, in all processors in its own partition, data of the shared area to be erased, in caches of all processors in its own partition are purged (step 2401). Thereafter, the pertinent entry in the address translation table of every node in the partition is invalidated (step 2402). The shared memory space, and the area (window area) allocated in the real address space in the partition to access the shared memory are released (step 2403). The TLB of every processor in the partition is purged (step 2404).

As a result, resources used to access the shared area can be completely released. Finally, the ACK is returned to the home partition (step 2405) to inform the home partition that the shared area has been completely released in its own partition.

By virtue of the procedure heretofore described, it is possible in the shared memory multiprocessor of the present invention to dynamically manage the memory shared among partitions.

By virtue of the configuration heretofore described, it is possible in the hierarchical bus connection SMP to realize a memory shared by partitions.

The function of resetting the partitions will now be described in detail. FIG. 17 shows a reset circuit according to the present invention. FIG. 17 shows only node 0. Other nodes also have absolutely the same configuration. Hereafter, the configuration of the node 0 will be described in detail. The CPU, the main memory access circuit, and the address translation circuit in each node are driven by a reset signal 921. Respective nodes have independent reset signals 921 to 928. Respective reset signals are driven by a reset transfer circuit 920. In addition, each node has a reset register 175 which can be accessed from CPUS, and each node can request resetting of other nodes.

First, if an external reset signal (reset at the time of power on, a signal from an ordinary reset button) 929 is driven, then reset signals (921 to 928) of all nodes are made active and all nodes are reset as usual.

The reset register of each node includes a node bit map 1751 indicating nodes to be reset, and an enable bit 1750. If the enable bit 1750 is set to "1", the reset signal is sent to nodes corresponding to "1" in the bit map 1751 through the circuit 920.

By virtue of the circuit heretofore described, it becomes possible for software of each node to reset arbitrary nodes.

In the case where a certain partition (hereafter referred to as partition A) suffers from system down, the following operations are conducted by software of one (hereafter referred to as partition B) of partitions which does not suffer from system down.

(1) The partition B senses that the partition A has suffered from system down. (It can be known by a heart beat function or the like via the shared memory.)
(2) The partition B conducts investigation of error cause and removal of an error cause via the memory shared by partitions, and prepare information so as to allow the partition A to resume its task.
(Since arbitrary addresses including the system area can be shared in the shared memory function of the present invention, error analysis including the OS is possible.)
(3) The partition B sets bits of the bit map 1751 corresponding to nodes of the partition A to "1" (and sets other bits to "0".)
(4) The partition B sets the enable bit 1750 to "1" and then restores it to "0". (As a result, a reset signal is conveyed to respective nodes of the partition A through the reset transfer circuit 920.)
(5) Owing to the processing heretofore described, the partition A can resume the execution. (By using the information of (2), application is resumed.)

By virtue of the reset function heretofore described, it becomes possible for partitions to back up each other, and high reliability can be realized.

The present invention is not limited to the embodiment heretofore described, but can be applied to various variations.

(1) In the foregoing description, the snoop command on the shared area is broadcasted to all nodes in the system.

In contrast thereto, there is also possible such a scheme as to broadcast only to nodes in partitions sharing the accessed shared area in order to reduce the traffic imposed on the switch.

The following points are changed.

When the destination of a command outputted from the inside of a node is decided in the destination indicate and global bit addition circuit 142 (see FIG. 5), the snoop (F, FI, I) command on a shared area is multicast to only nodes corresponding to "1" in the "partitions to be authorized to share" field 156 of the address translation table corresponding to the shared area. (As a result, the snoop command is not sent to partitions which do not share the area.)

The DND command and the DND acknowledge circuit are not used.

When acknowledges of the command on the shared area are waited in the acknowledge wait circuit 147, as many acknowledges as nodes corresponding to "1"s in the "partitions to be authorized to share" field 156 of the address translation table corresponding to the shared area are waited. (As a result, acknowledges of the command in the sharing partitions are waited.)

(2) In the foregoing description, nodes to be authorized to share are stored in the bit map 156 corresponding to each node. However, it is also possible to store nodes to be authorized to share in a bit map corresponding to each partition.
(3) In the foregoing description, the main memory access circuit 130 and the main memory 180 in the node are inserted between the address translation circuit 140 and the CPU bus 190. However, there is also possible such a scheme that the address translation circuit 140 is directly coupled to the CPU bus 190 (but is not directly coupled to the main memory access circuit 130). Apart from the address translation circuit 140, the main memory access circuit 130 is connected to the CPU bus 190. In this case, access from another node to the main memory 180 is conducted via the CPU bus 190. In this case as well, the present invention having the address translation means 140 at the entrance of each node can be utilized as it is.
(4) In the foregoing description, the components 141 to 145 and 147 are shown as separate circuits. By making the circuits of the output side (141,142 and 144) and the circuits of the input side (143, 145 and 147) common respectively, however, duplicated circuits such as the search of the address translation table can be reduced.
(5) In the foregoing description, addresses of the shared memory space can be taken in arbitrary positions. In order to realize arbitrary translation, address translation is realize in a full associative table.

In contrast thereto, by representing the node number by high-order bits of address of the shared memory space and representing the real address in the partition by lower-order bits, the address translation on the export side in the home partition can be significantly reduced. In this case, a real address in the partition can be translated to an address of the shared memory space by simply adding a node number as high-order bits. An address of the shared memory space can be translated to a real address in the partition by simply removing the node number in the high-order bits.

In this case, in order to store, in each node, the management information of shared areas with respect to the whole main memory space in the partition, there is needed a table for storing, every managed unit (having, for example, 1 MB) of shared area, a bit indicating whether sharing is possible (i.e., a bit for storing information as to whether the 1-MB space is a shared area or a not-shared area) and a bit map of nodes to be authorized to share (which is the same information as the field 156 of the address translation table).

As a result, the address translation and access check on the export side (home partition) can be significantly simplified and the hardware can be reduced.

(6) In the foregoing description, the address translation table of the export side is common to the address translation table of the import side. On the import side, however, a table different from that of the export side may be used. In this case, the "home node number" 155 on the export side (which is redundant information) can be eliminated.

(7) In the foregoing description, it is possible to freely read and write data with respect to the shared area. By making the shared area read only from the outside of a partition, however, the hardware can be simplified. In this case, check of the address and the node number (check in the circuits 1432 to 1434) in the shared area detect and address check circuit 143 is unnecessary. Furthermore, the "nodes to be authorized to share" field 156 needs only to be stored in the home node alone. If a write command such as FI, I, WB or UW comes from the outside of the partition, the shared area detect and address check circuit 143 reports an error.

Furthermore, by combining (5) to (7), the hardware quantity can be significantly reduced.

(8) By adding a read only bit to the address translation table, it is also possible to set only a specific shared area to read only from the outside of the partition. If in that case a write command such as FI, I, WB or UW comes from the outside of the partition to a shared area having a set read only bit, the shared area detect and address check circuit 143 reports an error.

(9) In the foregoing description, the destination indicate and global bit addition circuit 142 located at the exit of each node specifies the destination of the snoop (F, FI, I) command issued from the node. In contrast thereto, there is possible to adopt such a scheme that the inter-node connection switch 900 has information equivalent to the partition configuration information 160 and the destination is specified in the inter-node connection switch 900. In that case, if the global bit in the command is "1" (i.e., in the case of access to a shared area), the command is broadcasted to all nodes in the system is conducted. If the global bit in the command is "0" (i.e., in the case of access to a not-shared area), the command is multicast only to nodes in the same partition as the destination node.

(10) In the foregoing description, CPUs in the node are connected by the bus 190. However, other connection forms (such as connection using a switch, or one-to-one connection to the main memory access circuit 130) may also be used.

(11) In the above described embodiment, the main memory configuration information in partition 165 separately stores the ranges of the main memory respective nodes take charge of, by using pairs of the start address 166 and the end address 167. However, by using, for example, such a technique as to make the end address of the node n common to the start address of the node n+1, the hardware can be reduced. Furthermore, each node may take charge of a plurality of real address areas by providing a plurality of pairs of the start address 166 and the end address 167 as the areas each node takes charge of.

(12) In the foregoing description, CPUS (110 to 113) in the node have independent caches. However, an external cache (level-3 cache) shared by a plurality of CPUs may be provided. It is also possible to provide the main memory access circuit 130 of each node with a copy of the cache TAG of the CPU, and filter the cache coherent transaction coming from another node.

(13) In the foregoing description, the inter-node connection switch 900 is connected by a crossbar network. However, the inter-node connection switch 900 may also be connected by using a network of a different form (such as complete coupling or a multi-stage network).

(14) In the above described embodiment, broadcasting or multicasting is ordered by specifying the destination node in the bit map when issuing a network command to other nodes. However, broadcasting or multicasting may be realized by issuing a plurality of commands for each of the destination nodes from the destination indicate and global bit addition circuit 142.

According to the present invention, the inside of the hierarchical bus connection SMP is divided into a plurality of partitions. There is provided, at the gateway of each node, means for bidirectionally translating an address of a shared area between an address in a partition and a shared memory space address common to partitions, when realizing a shared memory between partitions. As a result, each partition has a free address space, and data in a shared area can be managed at high speed by a snoop protocol. In addition, an inter-partition shared memory mechanism making possible fault containment between partitions can be realized. Furthermore, by providing means for dynamically generating and erasing the above described address translation information, the shared memory between partitions can be managed flexibly.

What is claimed is:

1. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, said plurality of nodes being divided into a plurality of partitions, each of said partitions including at least one node, the partitions respectively locally sharing a main memory, wherein a memory address of said system comprises a local real address and an address of common memory space, said local real address being local to each of said plurality of partitions, said address of common memory space being used in common in a memory space used in common between said plurality of partitions, wherein a main memory of each node is accessed by using a local real address of a partition the node belongs to, and wherein as for access from each CPU to a main memory of another node, data of a main memory of a node in its partition is accessed via said network by coherently using a local real address of the partition, and access to data of a main memory of a node included in another partition is conducted by translating an access address to an address of said shared memory space when an access command is issued to said network and translating an address of said shared memory space to a local real address of said another partition when said access command enters said node included in said another partition.

2. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, said plurality of nodes being divided into a plurality of partitions each including at least one node locally sharing a main memory, a local real address local to each of said plurality of partitions is used as a memory address of the partition, wherein said shared memory multiprocessor includes an address translation means provided at a gateway of each of said plurality of nodes to said network, said address translation means being used when a shared area shared by at least two of said partitions is set in any of said main memories, an address specified by a command for accessing said shared area is subjected in said address translation means to mutual translation between said local real address used in a partition and an address of the shared are used in said network, and wherein a main memory of each node is accessed by using said local real address no matter whether it is said shared area.

3. A shared memory multiprocessor according to claim 2, wherein a command for accessing an area which is not shared between said partitions is exchanged between each node and the network for interconnecting nodes without conducting address translation.

4. A shared memory multiprocessor according to claim 2, wherein when sending out a snoop command from each of said plurality of nodes to the inter-node connection network, a command for accessing an area which is not shared between partitions is multicast to only nodes in the partition, and a command for accessing an area shared by partitions is broadcasted to all nodes belonging to at least partitions sharing the area.

5. A shared memory multiprocessor according to claim 2, wherein in said plurality of partitions, every node included in a partition having said shared area set in a main memory included in its partition has mapping means for mutually mapping between an address in a shared memory space and a local real address of the partition of said shared area.

6. A shared memory multiprocessor according to claim 5, wherein said mapping means conducts mapping in accordance with a table having mapping information set for each shared area, and as a result, a plurality of shared areas can be set as a whole.

7. A shared memory multiprocessor according to claim 2, wherein in said plurality of partitions, on a local real address space of a partition sharing a shared area set in a main memory of another partition, a window area for accessing a shared area set in the main memory of said another partition is provided, said window area does not have a main memory in its own partition, and every node in the partition having said window area has means for mutually mapping between a local real address of the own partition of said window area and said shared memory space address of said shared area.

8. A shared memory multiprocessor according to claim 7, wherein it is made possible for two or more partitions to share one shared area by permitting mapping between window areas respectively set in a plurality of partitions and a shared memory space address of one shared area.

9. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, wherein each of said plurality of nodes comprises information addition means, said information addition means being used when said plurality of nodes are divided into a plurality of partitions each including at least one node locally sharing a main memory and a shared area shared by two or more of said partitions, said shared area being provided in any of said main memories, and said information addition means adds information indicating whether a command sent out from a node to said network is a command for accessing said shared area or a command for accessing a local area in said partition which includes said node having said information addition means, to the command, wherein said local area is addressed by a local address local to said partition and said shared area is addressed by a shared address of said shared area, and wherein when said command is a command for accessing said shared area a shared address associated with said command is subjected to address translation to a local address to address a main memory in which said shared area is provided.

10. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, wherein each of said plurality of nodes comprises:
information addition means used when said plurality of nodes are divided into a plurality of partitions, each including at least one node locally sharing a main memory, and a shared memory area shared by two or more of said partitions is provided in any of said main memories, said information addition means adding information, indicating whether a command sent out from that node to said network is a command for accessing said shared area or a command for accessing a local area in said partitions, to the command, and when said command is a command for accessing said shared area, said information addition means translates an address specified by said command from a real address local to a partition including its own node to an address in the shared area and sends out a resultant address into said network, and means responsive to added information of a command received from said network indicating that the command is a command accessing said shared area, for translating an address of the shared area specified by said command to a real address local to a partition including its own node, wherein a main memory of each node is accessed by using the real address no matter whether that main memory is said shared area.

11. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network,
  wherein each of said plurality of nodes comprises:
    information addition means used when said plurality of nodes are divided into a plurality of partitions, each including at least one node locally sharing a main memory, and a shared area shared by two or more of said partitions is provided in any of said main memories, said information addition means adding information, indicating whether a command sent out from that node to said network is a command for accessing said shared area or a command for accessing a local area in said partitions, to the command,
    storage means for setting nodes included in a partition a node belongs to, and
    means responsive to a command received from said network being a command for accessing said local area, for checking whether the accessing node of the command is a node included in a partition that node belongs to, and responsive to a negative result, for suppressing access of said command,
  wherein said local area is addressed by a local address local to said partition and said shared area is addressed by a shared address of said shared area, and
  wherein when said command is a command for accessing said shared area a shared address associated with said command is subjected to address translation to a local address to address a main memory in which said shared area is provided.

12. A shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, and when said plurality of nodes are divided into a plurality of partitions each including at least one node locally sharing a main memory, a command for locally accessing a main memory in each of said partitions and a command for accessing a shared area of a main memory shared by a plurality of partitions are used,
  wherein each of said plurality of nodes comprises:
    storage means responsive to determination of partitions sharing said shared area, for setting nodes included in said partitions, and
    means responsive to a command received from said network being a command for accessing the local area, for checking whether the accessing node of said command is included in the nodes set in said storage means, and responsive to a negative result, for suppressing access of said command,
  wherein said local area is addressed by a local address local to said partition and said shared area is addressed by a shared address of said shared area, and
  wherein when said command is a command for accessing said shared area a shared address associated with said command is subjected to address translation to a local address to address a main memory in which said shared area is provided.

13. A shared memory multiprocessor system according to claim 12, wherein a plurality of said shared areas are set independently, and nodes of a set of partitions authorized to share each of said plurality of shared areas are independently set in said storage means.

14. In a shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, and when said plurality of nodes are divided into a plurality of partitions each including at least one node locally sharing a main memory, a local real address local to each of said plurality of partitions is used as a memory address of the partition,
  a shared area generation method of a shared memory multiprocessor comprising the steps of:
    when generating a shared area shared by two or more partitions of said partitions, allocating an area used as a shared area to a main memory of a node in one partition included in partitions attempting to share the shared area, said one partition being own partition; and
    defining address mapping to the allocated area and a shared area,
  wherein a local area is addressed by a local real address local to said partition and said shared area is addressed by a shared address of said shared area, and
  wherein when accessing said shared area a shared address associated with said accessing is subjected to address translation to a local real address to address a main memory in which said shared area is provided.

15. A shared area generation method according to claim 14, wherein the allocation of an area used as said shared area and the definition of said mapping are carried out by system software prepared in said one partition.

16. In a shared memory multiprocessor system having a plurality of nodes and a network for interconnecting nodes, each of the plurality of nodes including at least one CPU, at least one cache, and at least one main memory, cache coherent control being conducted between nodes sharing a main memory via said network, and when said plurality of nodes are divided into a plurality of partitions each including at least one node locally sharing a main memory, a local real address local to each of said plurality of partitions is used as a memory address of the partition,
  a shared area generation method of a shared memory multiprocessor comprising the steps of:
    when generating a shared area shared by two or more partitions in any of said partitions, allocating a window area in a partition in a local real address space in the partition, to partitions attempting to share the shared area, other than a partition having an area used as the shared area allocated in a main memory; and
    defining address mapping of the allocated area and a shared area,
  wherein a local area is addressed by a local real address local to said partition and said shared area is addressed by a shared address of said shared area, and
  wherein when accessing said shared area a shared address associated with said accessing is subjected to address translation to a local real address to address a main memory in which said shared area is provided.

17. A shared area generation method according to claim 16, wherein the allocation of the window area and the definition of mapping are carried out respectively by system software pieces respectively prepared in partitions other than a partition having an area used as a shared area and allocated in a main memory.

* * * * *